US007305129B2

(12) United States Patent
Chellapilla et al.

(10) Patent No.: US 7,305,129 B2
(45) Date of Patent: Dec. 4, 2007

(54) METHODS AND APPARATUS FOR POPULATING ELECTRONIC FORMS FROM SCANNED DOCUMENTS

(75) Inventors: Kumar H. Chellapilla, Sammamish, WA (US); Cormac E. Herley, Bellevue, WA (US); Trausti T. Kristjansson, Redmond, WA (US); Paul A. Viola, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 10/808,194

(22) Filed: Mar. 24, 2004

(65) Prior Publication Data

US 2004/0181749 A1    Sep. 16, 2004

Related U.S. Application Data

(63) Continuation-in-part of application No. 10/354,500, filed on Jan. 29, 2003, now Pat. No. 7,162,084, and a continuation-in-part of application No. 10/792,519, filed on Mar. 3, 2004.

(51) Int. Cl.
*G06K 9/46* (2006.01)
(52) U.S. Cl. .................................................. 382/174
(58) Field of Classification Search .................. None
See application file for complete search history.

(56) References Cited

U.S. PATENT DOCUMENTS 6,366,696 B1    4/2002  Hertz et al. .................. 382/183

6,411,313 B1    6/2002  Conlon et al. .............. 345/769
6,898,316 B2*   5/2005  Zhou .......................... 382/190
7,103,198 B2*   9/2006  Huang ........................ 382/100

FOREIGN PATENT DOCUMENTS

EP          0 905 643 A2    3/1999

OTHER PUBLICATIONS

NewSoft Presto! BizCard, User's Guide, 2001, NewSoft Technology Corp.*
Y. Caron, P. Makris and N. Vincent, "A Method of Detecting Objects Using Legendre Transform", RFAI Team Publication, Meghrebian Conference on Computer Science MCSEAI, Annaba (Algeria), May 2002, pp. 219-225.
T. Haenselmann, C. Schremmer and W. Effelsberg, "Wavelet-Based Semi-Automatic Segmentation of Image Objects", Proc. Signal and Image Processing (SIP 2000), Las Vegas, USA, 2000, pp. 1-8.

(Continued)

*Primary Examiner*—Brian Werner
*Assistant Examiner*—David P Rashid
(74) *Attorney, Agent, or Firm*—Westman, Champlin & Kelly

(57) ABSTRACT

A computer-implemented method and apparatus are provided for populating an electronic form from an electronic image. The method and apparatus identify a size, orientation and position of an object within the electronic image, and identify information elements from pixels within the image that correspond to the object. Fields of the electronic form are displayed to a user along with the identified information elements through a graphical user interface. The information elements are parsed into tagged groups of different information types. At least some of the fields of the electronic form are populated with the tagged groups to produce a populated form. The user is allowed to edit the populated fields through the graphical user interface.

37 Claims, 19 Drawing Sheets

OTHER PUBLICATIONS

S. Jehan-Besson, M. Barlaud and G. Aubert, "Region-Based Active Contours for Video Object Segmentation with Camera Compensation", Proceedings of IEEE Int'l Conference on Image Processing, 2001, vol. 2, pp. 61-64.

P. Viola and M. Jones "Robust Real-Time Object Detection", CRL-2001/01, Feb. 2001., pp. 1-29.

D. Kim and Y. Ho., "Shape Training for Video Object Segmentation", Int'l Workshop on Very Low Bitrate Video (VLBV) Coding, Oct. 2001., pp. 186-190.

K. Lee and W. Nick Street, "Learning Shapes for Automatic Image Segmentation", Proceedings of the INFORMS-KORMS Conference, Jun. 2000, pp. 1461-1468.

D.K. Park, H.S. Yoon and C.S. Won, "Fast Object Tracking in Digital Video", IEEE Trans. Consumer Electorics, Aug. 2000, vol. 46, No. 3, pp. 785-790.

M. Roggero, "Object Segmentation With Region Growing and Principal Component Analysis", Proceeding of the Photogrammetric Computer Vision ISPRS Commission III, Symposium, Sep. 9-13, 2002. Graz, Austria, pp. 289-294.

Y.C. Shao and L.C. Chen, "Object Segmentation in Elevation Space Using Mathematic Morphology", Proceedings of the 22$^{nd}$ Asian Conference on Remote Sensing, Singapore 2001, pp. 227-232.

T. Shioyama, H. Wu and S. Mitani, "Segmentation and Object Detection with Gabor Filters and Cumulative Histograms", Proc. of the 10$^{th}$ International Conference on Image Analysis and Processing (Venice), 1999, pp. 412-417.

K. Tieu and E. Grimson, "Object Segmentation with Pixel Stacks", Artificial Intelligence Laboratory, Massachusetts Institute of Technology, 2001, pp. 125-126.

A. Yla-Jaaski and F. Ade, "Grouping Symmetrical Structures for Object Segmentation and Description", Computer Vision and Image Understanding, vol. 63, No. 3, May 1996, pp. 399-417.

S.X. Yu, R. Gross and J. Shi, "Concurrent Object Recognition and Segmentation with Graph Partitioning", Neural Information Processing Systems, Dec. 2002, pp. 1-8.

Singapore Hotcard Technology PTE LTD, "www.hotcardtech.com", 2003, pp. 1-6.

Anonymous, "BizCardReader Features," XP002409421, URL:http://web.archive.org/web/20010803025823/bizcardreader.com/features.htm#BizCardReader%20Features>, Jun. 2001. pp. 1-6.

* cited by examiner

FIG. 12

METHODS AND APPARATUS FOR POPULATING ELECTRONIC FORMS FROM SCANNED DOCUMENTS

CROSS-REFERENCE TO RELATED APPLICATIONS

This application claims the benefit and is a continuation-in-part of U.S. application Ser. No. 10/354,500, filed Jan. 29, 2003, now U.S. Pat. No. 7,162,084 and entitled "SYSTEM AND METHOD FOR AUTOMATICALLY DETECTING AND EXTRACTING OBJECTS IN DIGITAL IMAGE DATA" and U.S. application Ser. No. 10/792,519, filed Mar. 3, 2004 and entitled "ASSISTED FORM FILLING."

FIELD OF THE INVENTION

The present invention relates to a computer-implemented method and apparatus for automatically populating electronic forms from scanned documents or other electronic images.

BACKGROUND OF THE INVENTION

Importing data from electronic images, such as scanned documents is a laborious task. Often one requires not nearly an electronic copy, such as a scan, of the image, but also the data or other textual information in a form that can be used. Most prior art systems for assisting the completion of computer-generated forms use optical character recognition, natural language processing and other artificial intelligence techniques to identify specific types of information elements within scanned documents. Once the information elements are identified, they are placed in the appropriate fields or locations on a selected form. However, these methods are widely known as being very unreliable.

In addition, prior art systems can process only one document at a time, which further adds to the labor and time associated with populated electronic documents. Also, the hardware used for scanning documents and assisting the completion of computer-generated forms requires the documents to have a predefined size and orientation so that they can be scanned appropriately. This can limit the versatility of the system and may require the purchase of specific hardware for scanning particular types of documents. For example, business card scanners are now available, which allow a user to feed business cards into the scanner, one card at a time, and extract contact information for populating an address book. The scanner is sized to accept a business card having a predefined size and orientation. These scanners are not usable for scanning other types and sizes of documents, such as purchase receipts and bills. Also, business cards must be scanned one card at a time, which reduces efficiency. Other business card-specific scanners, such as that sold by Hotcard Technology Pte Ltd, can scan multiple cards at one time, but the cards must have particular orientations on the scanner.

Form filling can therefore be tedious, time consuming, and highly susceptible to human error. Thus, there is an unmet need in the art for systems and methods that facilitate faster and more accurate form filling. Improved methods and apparatus are desired for populating electronic forms from scanned documents or other electronic images.

SUMMARY OF THE INVENTION

One embodiment of the present invention is directed to a method for populating an electronic form from an electronic image. The method includes: (a) identifying a size, orientation and position of a first object having any arbitrary orientation within the electronic image; (b) identifying information elements from pixels within the electronic image that correspond to the first object; (c) displaying fields of the electronic form and the identified information elements to a user through a graphical user interface; and (d) parsing the information elements into tagged groups of different information types; (e) populating the fields of the electronic form with the tagged groups to produce a populated form and allowing the user to edit the populated fields through the graphical user interface.

Another embodiment of the present invention is directed to a computer-readable medium comprising computer-executable instructions that, when executed by a computer, performs a method including: (a) identifying a size, orientation and position of a first object having any arbitrary orientation within the electronic image; (b) identifying information elements from pixels within the electronic image that correspond to the first object; (c) displaying fields of the electronic form and the identified information elements to a user through a graphical user interface; and (d) parsing the information elements into tagged groups of different information types; (e) populating the fields of the electronic form with the tagged groups to produce a populated form and allowing the user to edit the populated fields through the graphical user interface.

Another embodiment of the present invention is directed to a system for at least partially populating electronic forms. The system includes an object detection and extraction module, which processes pixels in the electronic image to identifying a size, orientation and position of an object having any arbitrary orientation within the electronic image. An optical character recognition module identifies information elements from pixels within the electronic image that correspond to the first object. A graphical user interface simultaneously displays fields of the electronic form and the identified information elements to a user. A parsing module parses the information elements into tagged groups of different information types and at least partially populates the fields with the tagged groups to produce a populated electronic form.

Yet another embodiment of the present invention is directed to a method for populating electronic forms from an electronic image having first and second objects of different information types. The method includes identifying a size, orientation and position of the first and second objects within the electronic image. The electronic image is divided into sub-images corresponding to pixels in the electronic image associated with the size, orientation and position of each object. Optical character recognition is performed on each sub-image to identify untagged information elements within the corresponding object. For each sub-image, the untagged information elements are parsed into tagged information elements. Fields in a first electronic form type are populated with the tagged information elements identified from the sub-image of the first object to produce a first populated form. Fields in a second electronic form type are populated with the tagged information elements identified from the sub-image of the second object to produce a second populated form. The first and second populated forms and the untagged information elements are displayed to a user through a graphical user interface. The user is allowed to edit the first and second populated forms through the graphical user interface.

BRIEF DESCRIPTION OF THE DRAWINGS

FIG. 12 is an illustration of a form-filling interface, which facilitates assisting a user to populate fields in an electronic form in accordance with one embodiment of the invention.

DETAILED DESCRIPTION OF ILLUSTRATIVE EMBODIMENTS

Figure 1:
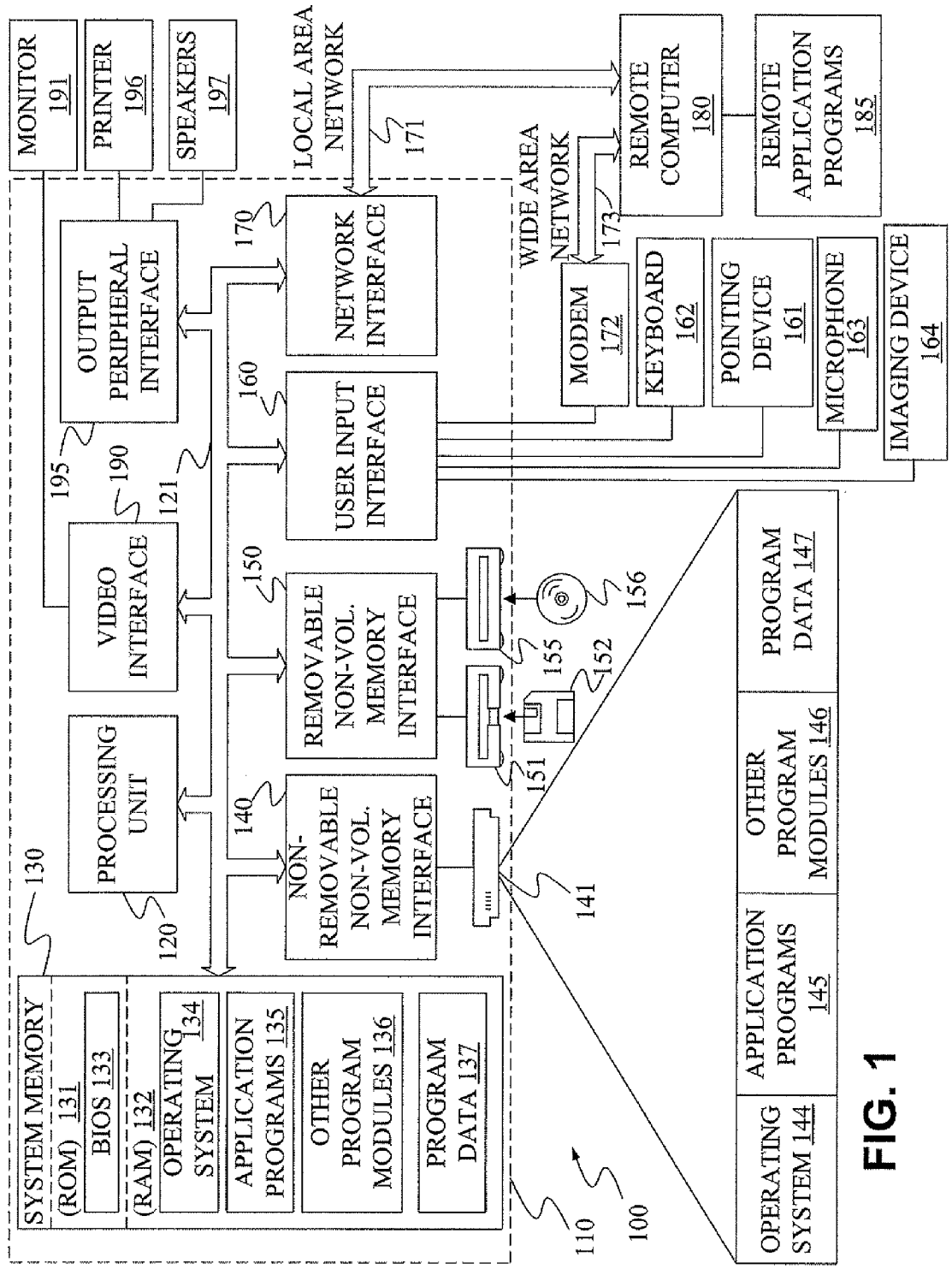
FIG. 1 is a block diagram of an exemplary system for implementing the invention in the form of a conventional personal computer, according to one embodiment of the present invention.

Embodiments of the present invention provide a method and apparatus for assisting a user in populating electronic forms with data obtained from electronic images of objects, such as business cards, bills, and purchase receipts. The electronic images can be obtained from any source, such as from electronic files or digital imaging equipment. In one embodiment, the images are obtained from a general purpose scanner or a digital camera. Each image can include one or more objects having unknown sizes, orientations and positions. Each object in the image includes untagged information elements of specific information types, such as name and contact information in the business card case or vender, date and amount in the receipt case.

Individual objects within the image are segmented, and the information elements within the segmented objects are identified. The system is capable of recognizing and segmenting many small documents that are scanned together in the same image. For each object in the image the system recognizes the textual data within the object, parses the textual data based on the specific information type and automatically populates fields in a target application or electronic form. For example, if the target application is contacts in an address book, the user can scan one or more business cards at a time and the system will extract names, phone numbers, email addresses and other information from the individual segmented business cards. A string of text containing ten digits is likely to be a U.S. phone number, and a string of the form xxxx@yyyy.zzz is likely to be an email address. The information elements from each business card are used to populate the user's contacts list automatically. An image can be retained for reference.

In another embodiment, the user can scan several receipts, drag and drop the date, amount, and/or other blocks of text to the appropriate fields in a financial software application, such as an expense report application, spreadsheet or money management software such as Microsoft Money™. An image of the receipt can be stored for reference and/or sent with the expense report. For expense report filing systems, a cryptographic hash of the image file can be encrypted using a public key of the paying party to prevent tampering with the digital image.

The system presents the parsed text and populated fields to the user through a graphical user interface and is forgiving of mistakes in that identified clusters of text can be dragged and dropped to appropriate fields. Also, the user can enter data directly into any one of the fields. Even if the optical character recognition (OCR) fails to correctly identify a block of text on a business card, such as the company name, it will likely have clustered that block of text. The user can then drag that block to the appropriate field. This is especially useful for applications where documents such as receipts are scanned. There can be many blocks of digits and text on a receipt of which the user typically will be interested in entering only the vender name, date, final amount and possibly the tax. So long as the text on the object is clustered, the user can drag appropriate blocks to appropriate fields in the form or target application.

FIG. 1 illustrates an example of a suitable computing system environment 100 on which some embodiments of the present invention can be implemented. Computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks (DVD), digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a pointing device 161, a keyboard 162, a microphone 163, and a digital imaging device 164. Pointing device 161 can include a mouse, trackball or touch pad, for example. Other input devices (not shown) may include a joystick, game pad, satellite dish, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

Computer 110 may operate in a networked environment using logical connections to one or more remote computers, such as a remote computer 180. Remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Within the context of some embodiments of the present invention, electronic images of objects such as business cards, bills and receipts can be obtained locally from sources such as digital imaging device 164 or from remote sources through modem 172 or LAN 171, for example. The images can also be obtained from files stored on any of the volatile or non-volatile memory storage media discussed above and/or shown in FIG. 1, for example. Digital imaging device 164 can include a general or special purpose scanner, a photocopier, a digital still camera, or a digital video camera, for example. Other types of imaging devices can also be used for obtaining an electronic image of one or more objects of interest.

I. Segmenting Multiple Objects from a Single Image

Optical scanners and other imaging devices are used to take objects containing printed information (such as text, illustrations or photographs) and convert the information into a digital form that a computer can use. In general, the user places objects to be scanned onto a platen of the scanner. A scanner head is passed over the platen area and the resultant image is divided into a plurality of pixels. Each pixel location is assigned a value that is dependent on the color or intensity of the pixel. The resulting matrix of bits (called a bit map) can then be stored in a file, displayed on a monitor, and manipulated by software applications.

As mentioned above, the user will frequently have a need to scan multiple objects. By way of example, the user may want to scan multiple business cards, bills or receipts. In order to save time, it is desirable to scan more than a single object at a time. Thus, the user will place multiple objects on the platen of the scanner and scan them in a single pass. This saves both time and energy, because the user does not have to repeat for each object the process of placing the objects on the scanner platen, closing the lid and interfacing with scanning software.

One problem with scanning multiple objects simultaneously is that the objects are represented in the scanned image as a single bit map. This means that when the scanned image is saved as a file, displayed on a monitor, or manipulated by a software application the image is considered as a single image or object. Frequently, a user will want to save each object as a separate file. Some scanning applications do allow the user to manually select the boundaries of each object and save the object as a separate file. However, this process of manually segregating each object within the scanned image is repetitious, tedious and time consuming.

Therefore, one embodiment of the present invention provides a simple and robust system and method for detecting and extracting multiple objects from a scanned image. This system and method allows a user to place multiple objects on a scanner, recognizes the number of objects on the scanner, and queries the user about whether he would like to store each object as a separate file or be used to populate separate electronic forms. Such a system and method makes the scanning process quicker and more efficient and relieves the user of the burden of manual segmenting each object in the scanned image.

A. System Overview

The object detection and extraction system and method described herein is capable of automatically finding desired objects within digital image data and segregating those desired objects from other objects and any background. This allows each object to be considered its own individual object while still retaining the advantages of scanning multiple objects in a single pass. Thus, each individual object can be saved as its own file or manipulated individually by a software application independent of the other object contained in the scanned image. For example, the system and method can distinguish between multiple business cards that are arranged adjacent each other when scanned by a single pass of a flatbed scanner.

In general, the object detection and extraction system and method is capable of detecting and extracting objects having a known shape but unknown size, orientation and number. This is achieved in part by defining an "image function" along each direction or dimension of the object. The image functions are a function of and representative of the data in the original image. By way of example, suppose that an image contains rectangular two-dimensional (2-D) objects. Suppose further that it is desired to determine the number of rectangular objects present in the image as well as each object's size, orientation and position. In order to determine this information, the object detection and extraction system and method defines two coupled one-dimensional (1-D) image characteristic functions. From these functions the number of objects and their size, orientation and position can be determined the majority of the time.

Each image function has certain requirements. One requirement is that the function should have a particular recognizable characteristic when only a single object of a desired type is present in the image. For example, if the object types are rectangles and the object characteristic function is a sum of the pixels along a particular direction that are located within the objects (called data pixels), the recognizable characteristic is that the function is a trapezoid. Of course, other desired objects types and other object characteristic functions will yield other recognizable characteristics. Typically, the recognizable characteristic is a shape, but in other embodiments the characteristic may be, for example, a pixel color or pixel intensity.

The object characteristic function is calculated along two or more different directions and the image is divided into sub-images wherever gaps or disparities in the data pixels are present. These gaps are indicative of the absence of desired objects at that position along one of the directions. The sub-division of the sub-images continues in an iterative fashion until the recognizable characteristics of the object characteristic functions indicate one of two possibilities. The first possibility is that the sub-image contains a single desired object (such as a single rectangular business card). The other possibility is that a single desired object cannot be found and no further sub-division is possible. If the latter occurs, the system informs the user that the complete number, size, orientation and position of the desired objects cannot be determined.

B. Image Processing System

Figure 2:
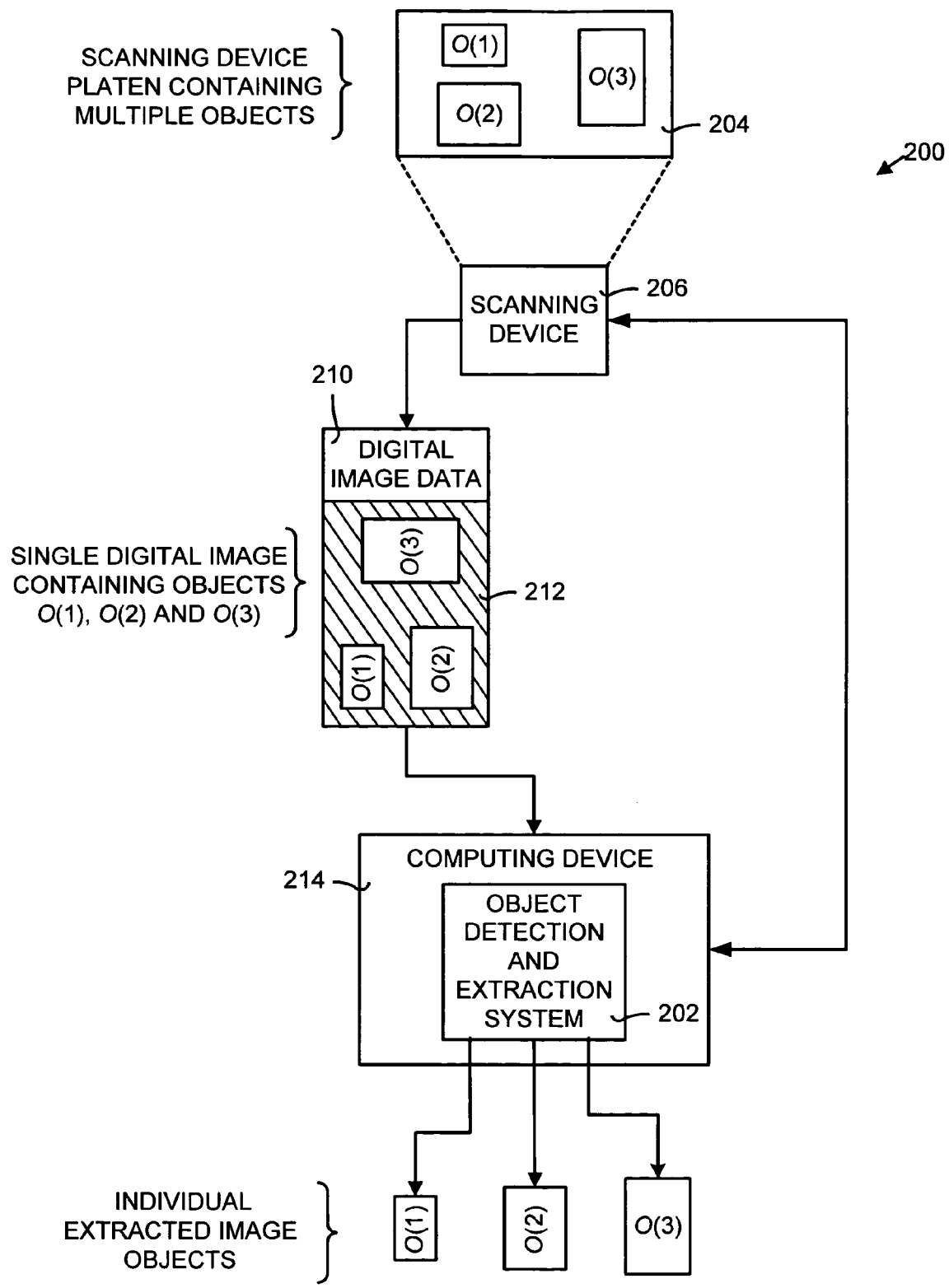
FIG. 2 is an overall block diagram of an exemplary implementation of an image processing system incorporating an object extraction system and method described herein.

FIG. 2 is an overall block diagram of an exemplary implementation of an image processing system 200 incorporating the object detection and extraction system and method described above. In general, digital image data is processed by an object detection and extraction system 202 to determine the number of objects and the size, orientation and position of each object contained in the digital image data. The system 202 achieves this by determining the boundaries of each object and automatically segregating the objects into separate image objects. This spares the user the time and effort of performing manual segregation of each object.

A user places multiple objects (such as business cards or receipts), O(1), O(2) and O(3), on a platen 204 of a scanning device 206 (such as a flatbed scanner or other digital imaging device 164 in FIG. 1). The dashed lines shown in FIG. 2 are to represent that the platen 204 is contained on the scanning device 206. The user then scans the objects positioned on the platen 204 and digital image data 210 is obtained. The digital image data 210 is a single digital image containing each of the objects (O(1), O(2) and O(3)) as well as background data 212. The background data, which is shown in FIG. 2 by the hatched lines, typically represents color of a lid (not shown) of the scanning device 206 that covers the platen 204 during the scanning process. In this exemplary implementation, it is assumed that the color of the background is known or can be estimated or determined.

The object detection and extraction system 202 is located on a computing device 214, such as within computing environment 100 shown in FIG. 1. As explained in detail below, the digital image data 210 is sent to the object detection and extraction system 202 and processed. The object detection and extraction system 202 finds each of the objects (O(1), O(2) and O(3)) within the digital image data 210 and extracts each object from the data 210. Once extracted, the objects can be processed as separate image objects apart from the other objects and the background data 212.

C. Object Detection and Extraction System

Figure 3:
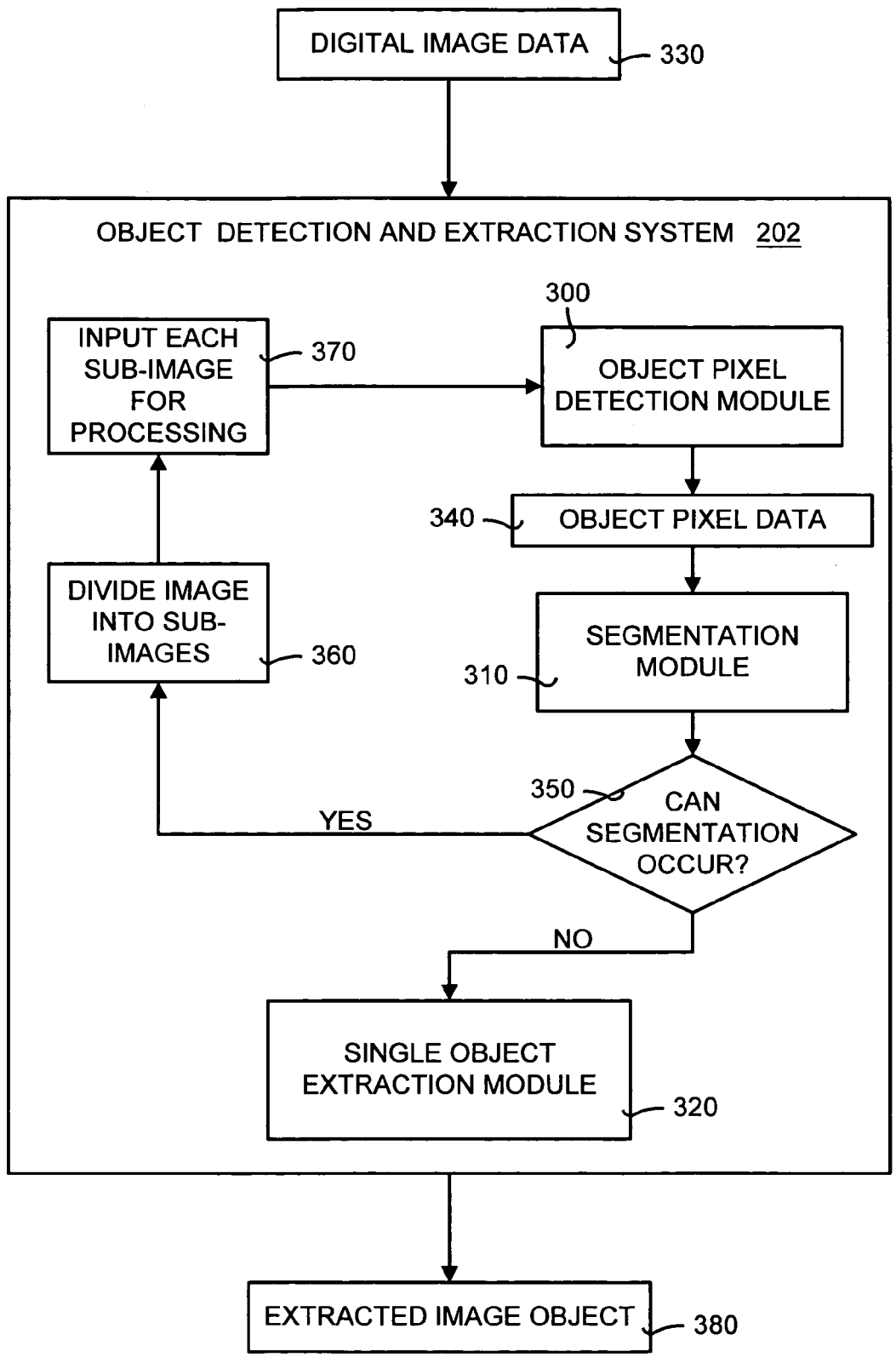
FIG. 3 is a block/flow diagram illustrating the components or modules of the object extraction system shown in FIG. 2.

Object detection and extraction system 202 includes a number of program modules, shown in FIG. 3, that allow the system to automatically distinguish between one or more objects in digital image data 210. Object detection and extraction system 202 includes an object pixel detection module 300, a segmentation module 310, and a single object extraction module 320.

An image 330 (such as image data 210 shown in FIG. 2) is received by data pixel detection module 300, and module 300 analyzes and classifies each pixel within the image to obtain pixel data 340. The pixel data 340 contains information such as whether a pixel is a data pixel or a background pixel. Data pixels are pixels that are located within any of the objects located in the image 330. On the other hand, background pixels are pixels that are outside the objects and in the background. In addition, the pixel data 340 includes information such as the number of data pixels along two or more directions of the image 330. The data pixel detection module also defines an image function to process the pixel data. For example, if the image function is defined to sum the data pixels in a direction of the image, the pixel data 340 will contain the number of data pixels along one axis of a coordinate system describing the image 330 and the number of data pixels along another axis of the coordinate system.

Next, the pixel data 340 is sent to segmentation module 310. Segmentation module 310 determines whether there are any disparities or gaps in the image function and pixel data 340. As explained in detail below, these disparities usually are regions in the image 330 where there are few data pixels (relative to the surrounding regions) or no data pixels whatsoever. It is then determined whether the image 330 can be divided (box 350) based on whether disparities are found. If so, the image 330 is capable of being divided and is divided along the corresponding disparity. This has the effect of breaking the image 330 into multiple pieces or sub-images (box 360). Each sub-image then is submitted to the data pixel detection module 300 for processing (box 370) and the recursive process begins again with the image 330 being replaced by a portion of the image 330 (i.e., each of the sub-images). This iterative process for each sub-image continues until the sub-image contains only a single object or no further division of the sub-image is possible. In the first situation, the sub-image is sent to the single object extraction module 320 for processing. In the second situation, the system and method inform the user that the number, size, orientation and position of objects in the sub-image cannot be determined. However, the latter situation occurs infrequently, as the system and method are quite robust. The method therefore locates and segregates each object by recursively decomposing the image into sub-images. This decomposition continues until each sub-image either contains a single object or cannot be further decomposed.

As stated above, if no disparities are present, then the portion of the image 330 that cannot be divided is sent to the single object extraction module 320. Single object extraction module 320 processes image 330 such that an object within the image 330 is detected and extracted and a number, size, orientation and position of the objects in the image 330 are found. The extracted object 380 is output from the object detection and extraction system 110. For example, the extracted object can include a sub-image of a single business card or receipt within the overall image 330.

Figure 4:
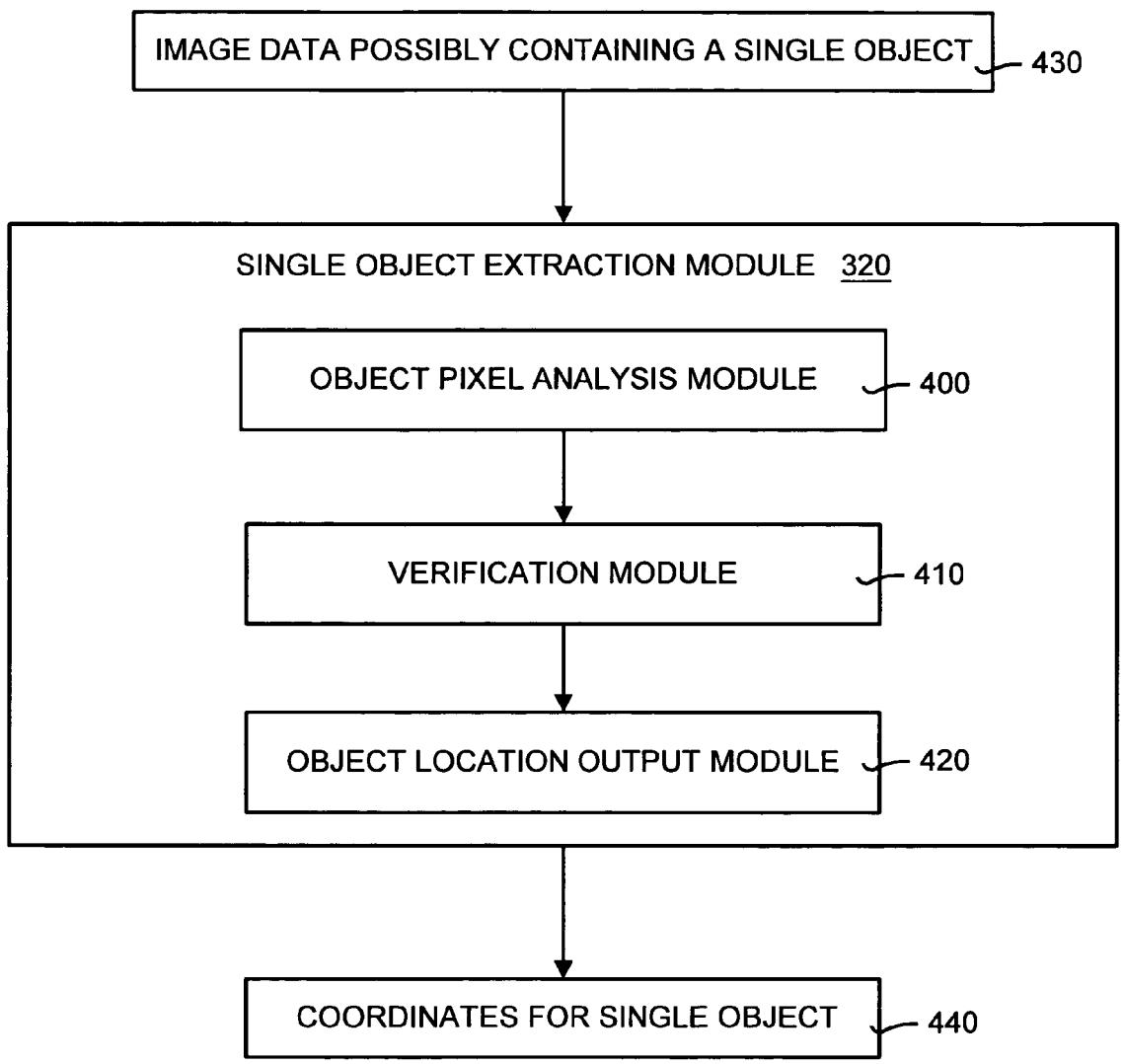
FIG. 4 is a block diagram illustrating the details of a single object extraction module shown in FIG. 3.

FIG. 4 is a block diagram illustrating the details of the single object extraction module 320 shown in FIG. 3. In general, the single object extraction module 320 examines a sub-image that may contain either a single object or no object at all and, if present, locates the object. The module 320 processes each sub-image from the main image 330 after it has been determined that the sub-image cannot be divided any further. Alternatively, the module 320 processes the main image if it is determined that the main image 330 cannot be divided.

The single object extraction module 320 includes a pixel analysis module 400, a verification module 410 and an object location output module 420. A sub-image 430 that possibly contains a single object is received by the pixel analysis module 400 and pixel data is generated. Based on the pixel data, estimated coordinates of the location of an object within the sub-image 430 are calculated. The estimated coordinates are sent to the verification module 410. The verification module 410 compares each of the estimated coordinates with the main image 330 of which the sub-image 430 is a part. Note that it is possible that the image 330 can be the same as the sub-image 430. The comparison is used to determine whether any of the estimated coordinates are a plausible fit with the image 330 and verify the existence of an object in the sub-image 430. If a plausible fit is found, then the correct coordinates are sent to the object location output module 420 and then sent as output (box 440). From the coordinates, the object can be segregated and extracted from the sub-image 430. If a plausible fit is not found, then the object location output module 420 is informed of this by the verification module 410. In this case, the object location output module 420 does not output the coordinates of the single object but instead outputs a message stating that an object could not be found in the sub-image 430.

D. General Flow of Object Detection and Extraction System

Figure 5:
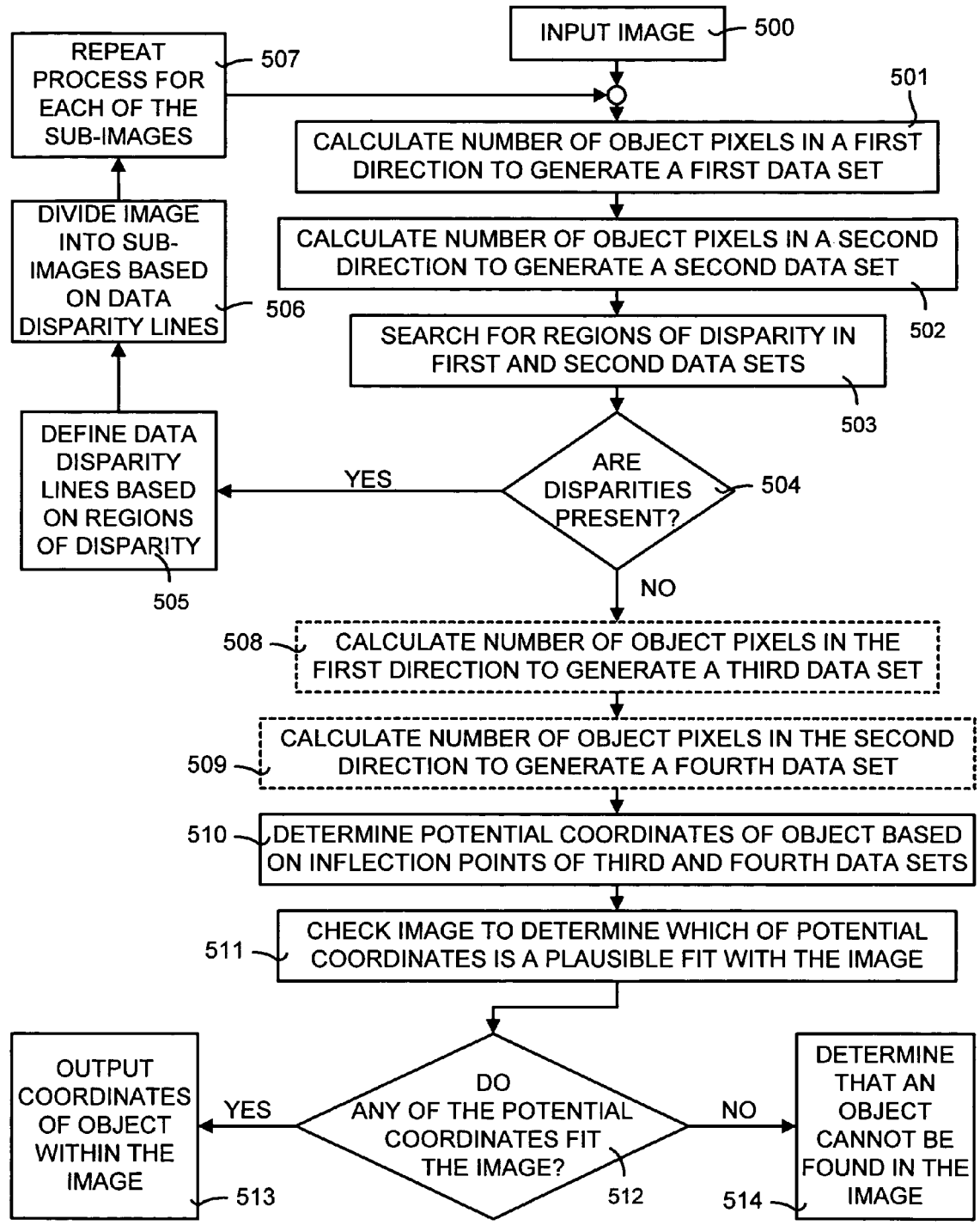
FIG. 5 is a general flow diagram illustrating further detail of the object detection and extraction process shown FIG. 4.

FIG. 5 is a flow diagram illustrating an example of the details of the object detection and extraction method shown in FIGS. 2-4, according to one embodiment of the present invention. An image is received at step 500. The number of data pixels in a first direction are calculated to generate a first data set, at step 501. Similarly, the number of data pixels in a second direction are calculated to generate a second data set, at step 502. By way of example, the image is typically a scanned rectangular image containing rows and columns of pixels. An image function can be defined as the sum of the data pixels in a direction. In this situation, the number of data pixels in a row are calculated for every row in the image. Similarly, the number of data pixels in a column are calculated for every column of the image. The first data set contains the distribution of data pixels over the rows of the image and the second data set contains the distribution of data pixels over the columns of the image.

Next, the first and second data sets are searched, at step 503, to determine if any regions of disparity are present, at step 504. These disparity regions, or gaps, are areas in the image where there are few or no data pixels. If disparities are present, then a data disparity line is defined along the regions of disparity, at step 505. For example, if a row in the image contains no data pixels a data disparity line is defined along that row. Based on the data disparity line, the image is divided or segmented into sub-images, at step 506. Once these sub-images, are created, they are treated as separate images apart from the input image from which they came. Each sub-image then is processed again individually, at step 507. Thus, boxes 501-506 are repeated in an iterative process for each sub-image.

If the sub-image being processed has no disparities present, at step 504, then the sub-image is processed again, individually. This involves calculating the number of data pixels within the sub-image in the first direction to generate a third data set, at step 508 and the number of data pixels in the second direction to generate a fourth data set, at step 509.

It should be noted that if no disparities are found in the initial (or first) iteration of the method then boxes 508 and 509 will not need to be performed. This is because the number of data pixels in the first direction and the number of data pixels in the second direction will already have been calculated for the image in boxes 501 and 502. This is denoted in FIG. 5 by the dotted boxes outlining steps 508 and 509.

Once the pixel data has been calculated, inflection points of the data are used to determine potential coordinates of the object, at step 510. There may be more than one object corresponding to the pixel data. For this reason, the potential coordinates are checked against the input image to determine which (if any) of the potential coordinates is a plausible fit with the input image, at step 511. If the determination at step 512 is positive and one set of the potential coordinates is a plausible fit, then those coordinates are sent as output at step 513. Once the coordinates and location of an object within the image is known, the object can be segregated and extracted from the image. If there is no plausible fit of the potential coordinates to the image, then it is determined that an object cannot be found in the image, at step 514.

E. Working Examples

In order to illustrate the details of the object detection and extraction method, two working examples will now be presented.

1. Single Object Case

Figure 6:
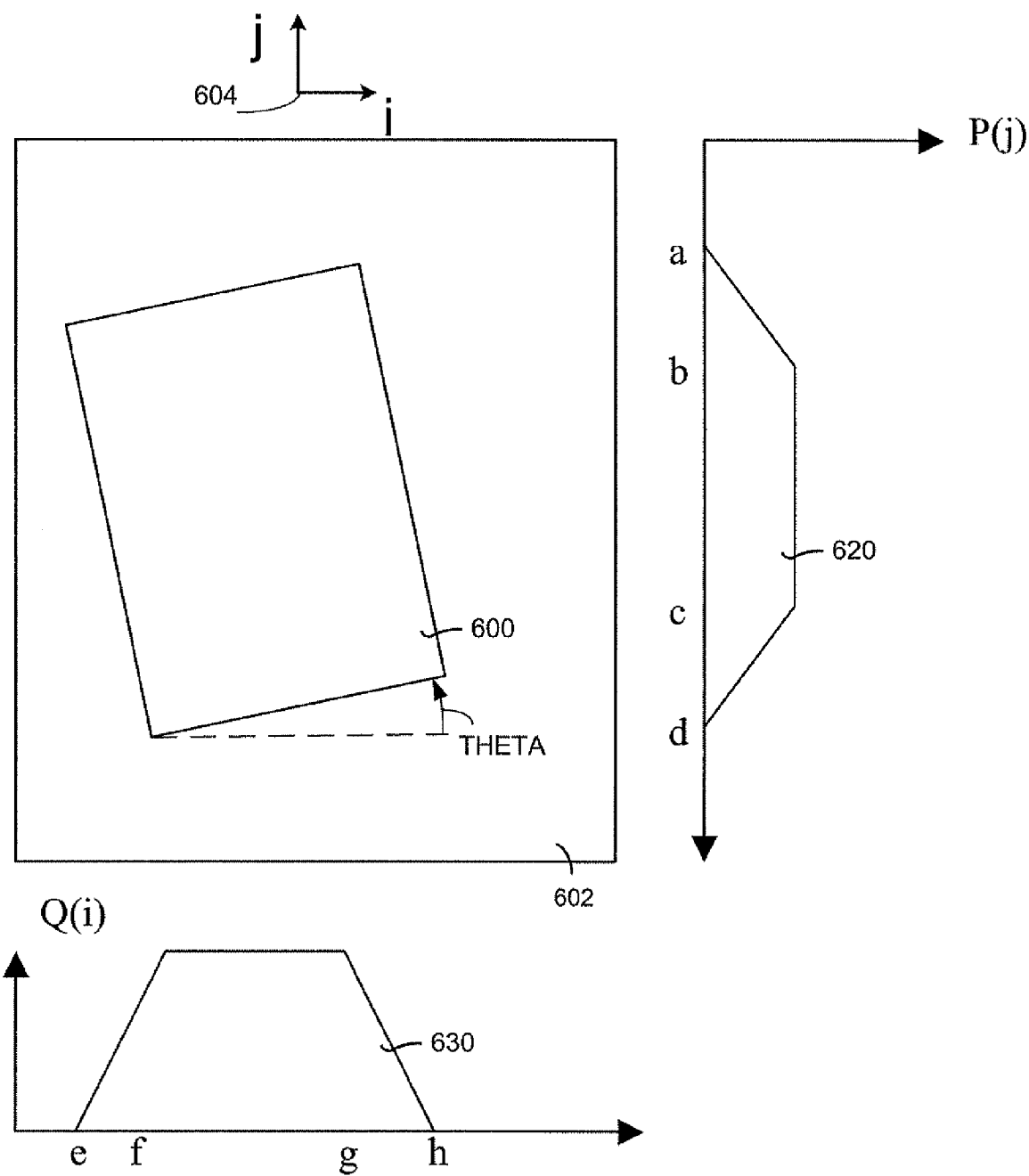
FIG. 6 illustrates a first working example of using the object detection and extraction method to find a single object in an image.

FIG. 6 illustrates an object 600 within a scanned image 602. In this working example, the object 600 is a rectangular object, such as a receipt. It is assumed that object 600 has a predefined shape, such as a rectangle. However, the size, orientation and position of object 600 are unknown.

The first step in extracting the object is to classify each pixel in the scanned image 602 as either a background pixel or a data pixel. In this working example, the classification is performed by examining the color of each pixel. A background pixel is a pixel that is located outside of the object 600. On the other hand, a data pixel is a pixel that is located within the object 600. It is assumed that the color of the background b (i.e. the value of pixels exterior to the object 600) is known or can be estimated. In addition, it is assumed that at least a majority of the pixels within the object 600 differ from b by more than a threshold amount. In mathematical terms, any pixel in the scanned image 602 for which, $$|Im(i,j)-b|>\text{threshold}$$

is defined as a data pixel and all other pixels are defined as background pixels. It should be noted that a color rather than grayscale method to distinguish between data and background pixels can be used, and the decision can be based on a method more complex than use of a single threshold.

Next, a summation is performed of the data pixels using axes established on the scanned image 602. In this working example, a two-dimensional orthogonal coordinate system 604 was established on the scanned image 602 such that an i-axis corresponds to the horizontal direction (or rows) and a j-axis corresponds to the vertical direction (or columns). First, the number of data pixels in each row was calculated. This was accomplished by summing the number of data pixels along the i-axis for a fixed j value, designated as P(j) (where P(j) is the image function in the rows or i direction). This is performed for all values of j. The resultant graph for P(j) (the summation of data pixels in the $j^{th}$ row) is a first trapezoidal shape 620. Second, the number of data pixels in each column was calculated. The number of data pixels was summed along the j-axis for a fixed i value, designated as Q(i) (where Q(j) is the image function in the columns or j direction). This is performed for all values of i. The resultant graph for Q(i) (the summation of data pixels in the $i^{th}$ row) is a second trapezoidal shape 630.

Elementary geometry then was used on the first and second trapezoidal shapes 620 and 630. From this geometry, it follows that the top part of the graph of P(j) is equal to x cos(theta) and that the top part of the graph of Q(i) is equal to y sin(theta), where x and y are the dimensions of the object 600 and theta is the angle at which it is oriented. The corners of the object 600 are the four coordinate points (g,a), (h, c), (f,d) and (e,b), which correspond to the inflection points of the first trapezoidal shape, P(j), and the second trapezoidal shape, Q(i).

Figure 7:
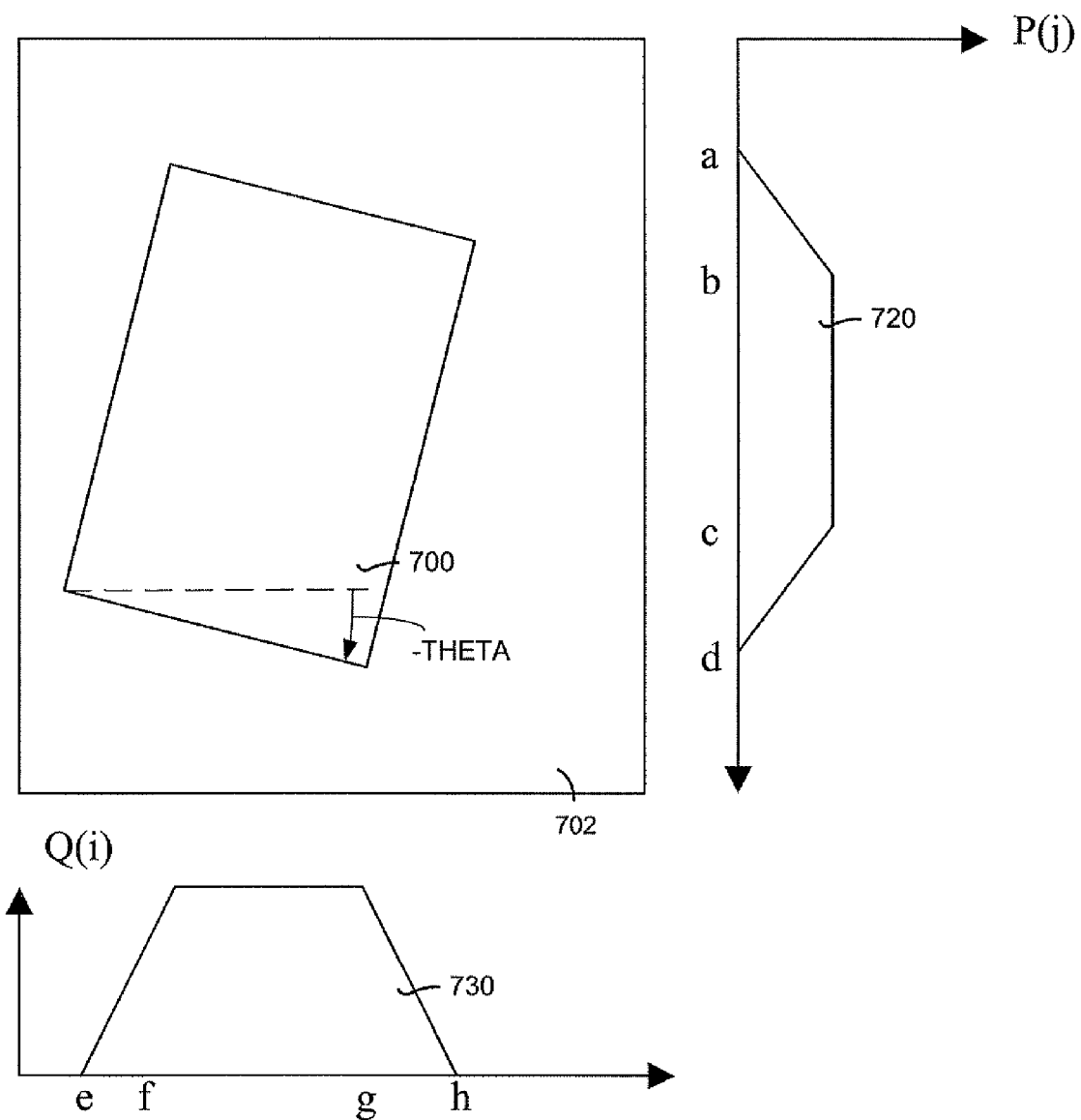
FIG. 7 illustrates an object having the same size but different orientation as the object in FIG. 6.

It should be noted that there is another situation in which an object in the scanned image 602 would yield the same graph of P(j) (the first trapezoidal shape 620) and the same graph of Q(i) (second trapezoidal shape 630). This possibility is shown in FIG. 7. In this situation, a second object 700 is located within a second scanned image 702. The second object 700 has the same size of the first object 600 shown in FIG. 6, but has an inverse orientation (i.e., the second object 700 is oriented at angle (−theta) instead of angle (theta). The second object 700 has coordinates (h,b), (g,d), (e,c) and (f,a) and is the only other possible object that would generate the identical trapezoidal shapes 720 and 730.

In this single object case, it can be determined that either the first object 600 or the second object 700 are present in the scanned images 602 and 702. However, a check must be made as to which object is present. In order to determine which object is present, the vertices for each object are checked against the scanned image data. The object that best fits the data then is used and the other object is discarded. In other words, each rectangle is analyzed to determine that a rectangle of that size, position and orientation actually contain almost all of pixels for which |Im(i,j)−b| are greater than the specified threshold. The case of using a single threshold to distinguish data and background pixels is used as example. More complicated strategies, for example using all three colors in a color image, rather than a single color in a grayscale image, can yield superior results.

2. Multiple Object Case

Figure 8:
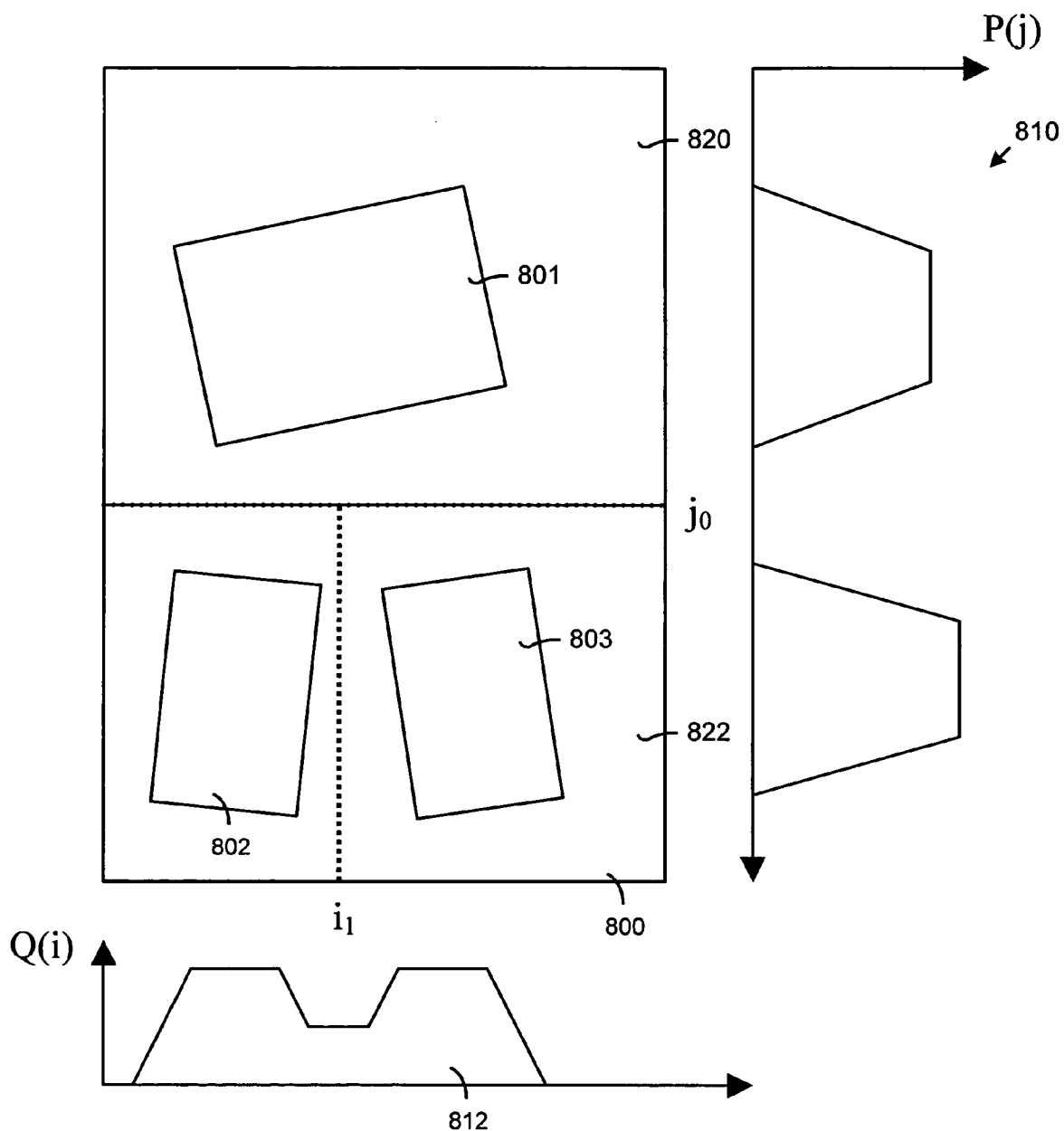
FIG. 8 illustrates a second working example of using the object detection and extraction method to find multiple objects in an image.

The object extraction method disclosed above for a single object case can be extended to a multiple object case. In general, this involves breaking the multiple object case into a plurality of single object cases, which can be solved as describe above. As shown in FIG. 8, in this second working example a scanned image 800 includes multiple objects, namely, a first object 801, a second object 802 and a third object 803. In this multiple object case, the same object extraction method disclosed above is used but in a recursive manner.

Specifically, similar to the single object case, each pixel in the scanned image 800 was classified as either a data pixel or a background pixel. This classification was performed based on pixel color. Next, an image was defined as the sum of the data pixels in a certain direction. In this working example, a summation of data pixels along the axes was calculated and a resultant graph for P(j) (the summation of data pixels in the $j^{th}$ row) is a first trapezoidal shape 810 and the resultant graph for Q(i) (the summation of data pixels in the $i^{th}$ row) is a second trapezoidal shape 812. It should be noted that in this case when the scanned image 800 consists of multiple objects, the quantities P(j) and Q(i) will consist of the sums of the trapezoidal shapes generated by each of the individual objects.

It would be difficult to estimate the parameters of the trapezoidal shapes 810 and 812 without some simplification. Observe, however, that in the first trapezoidal shape 810, the P(j) graph has a disparity in the data (or gap) at $j_0$, which is a location where P(j) is equal to zero. This indicates that there is no image data at this location and thus the portions of the scanned image 800 above and below row $j_0$ are treated separately. Taking advantage of this fact, the object detection and extraction method divides the scanned image 800 into two sub-images: (1) a top sub-image 820 (the rows above $j_0$); and (2) a bottom sub-image 822 (the rows below $j_0$).

Figure 9:
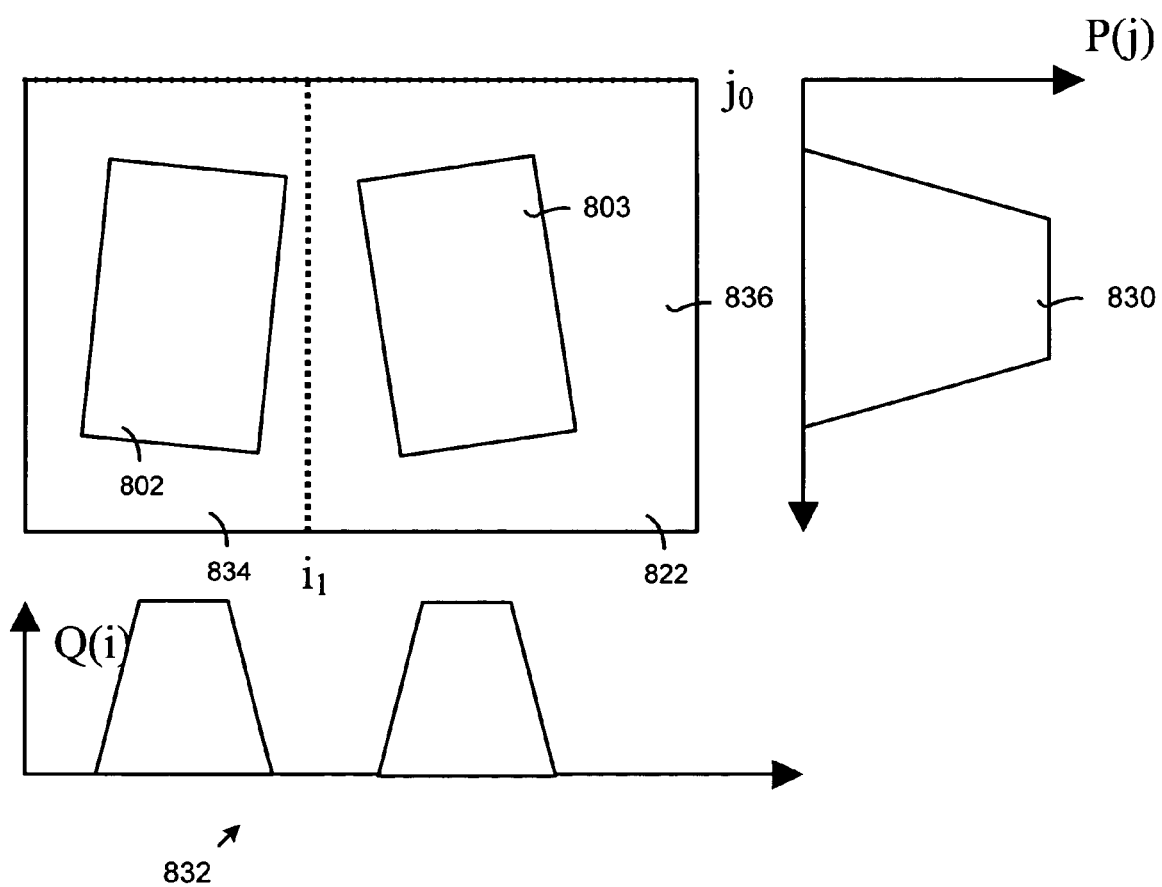
FIG. 9 illustrates the processing of a sub-image of the image shown in FIG. 8.

Once the scanned image 800 is divided, the object detection and extraction method described above is used again to process each of the sub-images 820 and 822. In particular, the image function in both direction (P(j) and Q(i)) are calculated over the top sub-image 820 and the bottom sub-image 822. Referring to FIG. 8, it can be seen that the top sub-image 820 contains a single rectangle (the first object, 801) such that the problem decomposes into the single object case described above. Thus, the coordinates of the first object 801 are found by using the method described above for the single object case The bottom sub-image 822 includes the second object 802 and the third object 804. Performing another iteration of the object detection and extraction method, each pixel within the bottom sub-image 822 is classified as either a data pixel or a background pixel based on pixel color. The processing for this iteration is shown in FIG. 9. In particular, the quantities for P(j) and Q(i) were calculated. A resultant graph for P(j) is a first trapezoidal shape 830 and the resultant graph for Q(i) is a second trapezoidal shape 832. As shown in FIG. 9, there is a data disparity (or gap) in Q(i) at location $i_1$. This indicates that this bottom sub-image 822 can be divided into even further sub-images by taking those columns to the left of $i_1$ (the left sub-sub-image 834) and those to the right of $i_1$ (the right sub-sub-image 836).

F. Example of Pseudocode

By way of example and not limitation, the following pseudo-code describes one possible implementation of the object detection and extraction method:

```
function procMult(Im);
    I0 = 0; j0 = 0; i1 = leni; j1 = lenj;
    [P, Q] = getProjections(Im);
    [gapsi, gapsj] = getGaps(P, Q);
    if ((length(gapsi)−2)+(length(gapsj)−2)<1)
        drawObject(Im, P, Q);
    else
        for m = 0:length(gapsi)−2
            for n = 0:length(gapsj)−2
                procMult (Im(gapsi(m):gapsi(m+1),
                    gapsj(n):gapsj(n+1))
            end
        end
    end
    The called functions are as follows:
    [P, Q] = getProjections(Im)
        routine to calculate P(j), Q(i) over
        image region
    [gapsi, gapsj] = getGaps(P,Q)
        determine position of any gaps in
        P(j), Q(i). The response to the image
        in FIG. 6 would be gapsi = [0, $i_{max}$]
        and gapsj [0, $j_{max}$], and to FIG. 8
        would be gapsi = [0, $i_{max}$] and gapsj =
        [0 j0 $j_{max}$].
    drawObject(Im, P, Q)
        Examine P(j) and Q(i) for trapezoids,
        estimate their parameters and
        determine whether any rectangle fits
        the data. If so, add vertices to
        global list.
```

G. Implementation Issues

The above discussion assumes that there is no confusion between background pixels and data pixels. In this ideal situation, the trapezoids formed by graphing P(j) and Q(i) will be ideal trapezoids and the inflection points can be easily be determined with confidence.

In practice, however, it may not be possible to classify all pixels accurately. This inaccuracy has the effect that the trapezoids may differ from the ideal due to, for example, noise. Fortunately, however, since the image functions (P(j) and Q(i)) are defined as a sum is taken over all of the pixels in a direction, the P(j) and Q(i) functions are inherently robust. In addition, because the top line of these trapezoids typically are the most common value, this is easy to estimate robustly from a histogram. The inflection points then can be estimated as the points that are within thresholds of this common value. Moreover, when determining whether there are data disparities or gaps present in the P(j) and Q(i) functions, it generally happens that noise or mis-estimation of the background color ensures that P(j) and Q(i) seldom exactly equal to zero.

Although the image functions (P(j) and Q(i)) used in this working example were defined as the sum of the data pixels in two or more different directions, it should be noted that other definitions also may be used. By way of example, an image function, R(j), may be defined to equal the column position of the rightmost data pixel minus the column position of the leftmost data pixel, and another image function, S(i), may be defined to equal the row position of the topmost data pixel minus the row position of the bottommost data pixel. In this situation, R(j) and S(i) would also enable the object detection and extraction system and method to operate efficiently. In fact, in the absence of noise, it should be noted that P(j)=R(j) and Q(i)=S(i) when the image consists of a single rectangular object.

In one embodiment the object detection and extraction process is applied to a sub-sampled version of the image. The advantage of using a sub-sampled version of the image is that this avoids dealing with high resolution image data.

H. Additional Embodiments

In one embodiment the object detection and extraction process is applied to a sub-sampled version of the image. The advantage using a sub-sampled version of the image is that this avoids dealing with high resolution image data.

In another embodiment, once it is determined that a sub-image probably contains only a single object, a fitting algorithm is used to estimate the best fit of a trapezoid to the P(j) and Q(i) functions. Then, the inflection points (or knee points) of the trapezoid that best fits the data are used to form estimates of the vertices of the object.

In still another embodiment, once an estimate of the vertices of the single object in a sub-image has been found, the best fit of a single object to the contents of the sub-image is determined. This is achieved by using a technique that determines a rectangular object that minimizes the squared mean (or other metric) between the actual data in the sub-image and the proposed rectangular fit.

In yet another embodiment if it does not prove possible to determine the background color of the scanner platen automatically, the user can point to a background pixel with a pointing device such as a mouse to assist the procedure.

In another embodiment if the algorithm fails to correctly segment an object the user can indicate the boundaries or corners of the object to assist the procedure.

II. Optical Character Recognition and Clustering of Each Segmented Object

Once the object detection and extraction system 202 (shown in FIG. 2) has output the coordinates of each identified object and these objects have been extracted from the overall image, the image of each object can be processed to identify useful information elements contained in the object. These information elements can then be clustered and provided to a module for assisting a user in filling an associated electronic form, such as a contact entry in an address book or an entry in an expense report.

Figure 10:
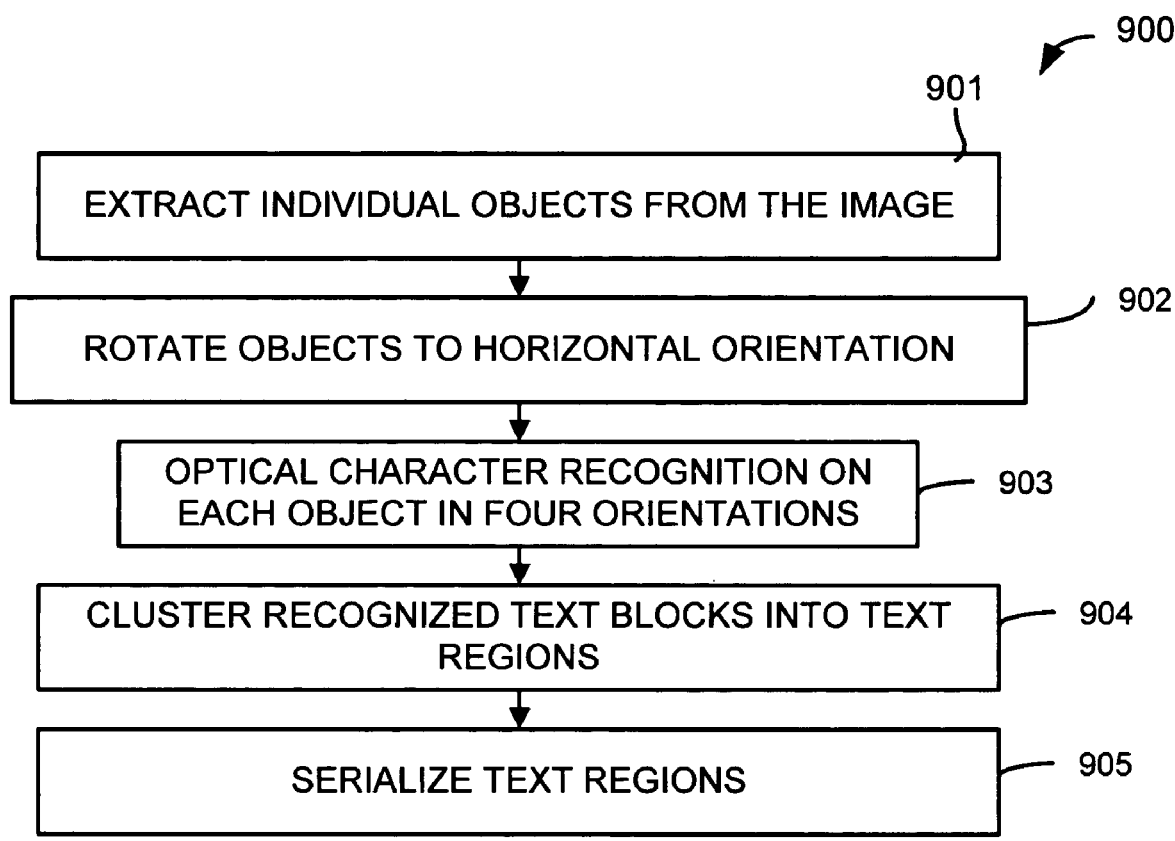
FIG. 10 is a flow chart illustrating a method of optically recognizing text within each object image and clustering the recognized text.

FIG. 10 is a flow chart illustrating a method 900 for identifying information elements and clustering the elements according to one embodiment of the present invention. At step 901, the individual objects identified by object detection and extraction system 202 are extracted from the overall image. In one embodiment, each object is a rectangle of any orientation. These rectangles can correspond to business cards, receipts or other types of objects.

At step 902, each object is rotated to be oriented horizontally, right-side up. As described above, the objects can be randomly placed on the scanner with any arbitrary orientation, such as right side-up, sideways, upside-down or any angle in between.

At step 903, the image of each rotated object is processed using an optical character recognition (OCR) module in all four orthogonal orientations, just in case the object was rotated upside-down or sideways in step 902. These orientations include orientations that are rotated zero degrees, 90 degrees, 180 degrees and 270 degrees from an assumed right side-up horizontal position. Step 903 is used to determine object orientation along with text context and location information. The output of the step 903 is a list of recognized text blocks and their two-dimensional (2-D) locations on the object.

The text blocks can include any information elements, such as strings of alphanumeric characters or other symbols. These elements can take any useable form, such as words, numbers or other graphical information.

At step 904, the text blocks recognized in step 902 are clustered to identify text regions. Examples of text regions include: 1) name and title (such as at the top of a business card); 2) home, work, and mobile phone numbers and fax information; 3) e-mail and web URL information; and 4) logo and company name, etc. These text regions are characterized by the inter-word spacing being much smaller on average for words within these regions when compared to the spacing between different text regions. These text regions are non-overlapping. The process of clustering words into text regions is described in more detail below with reference to FIG. 11.

At step 905, the text regions for a particular object are serialized to a single stream of text with appropriate text region delimiters. For example, the text regions can be serialized in order from the left-top corner of the object to the right-bottom corner of the object. The text region delimiters can include line breaks or paragraph breaks, for example. The clustered, serialized text regions are then passed to an assisted form-filling module for use in filling an associated electronic form, such as a contact record in an address book.

Figure 11:
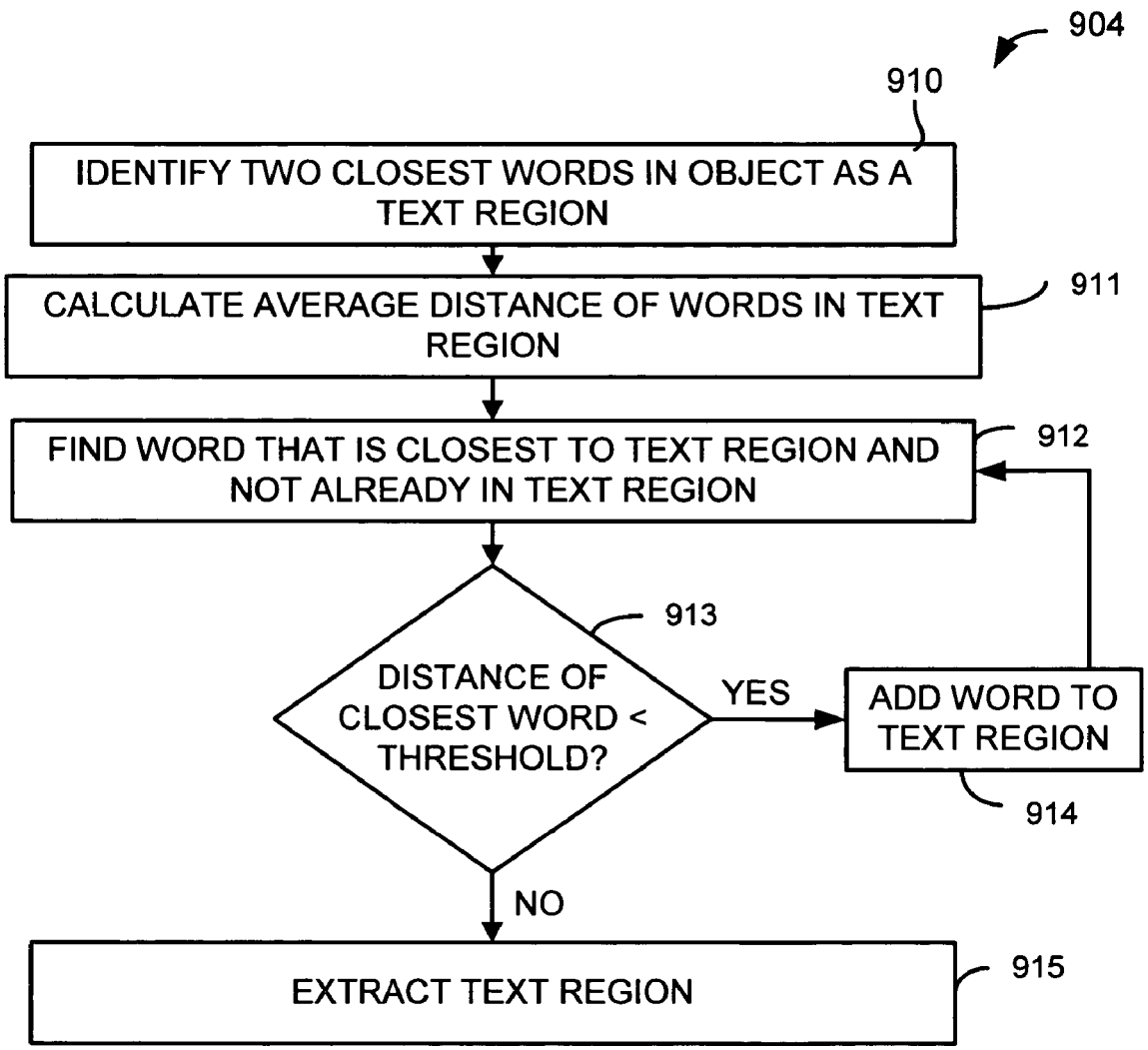
FIG. 11 is a flow chart illustrating steps performed while clustering the recognized text in the method shown in FIG. 10.

FIG. 11 is a flow chart illustrating a method for clustering words in text regions within step 904 of FIG. 10. As mentioned above, the words identified in step 903 of FIG. 10 are clustered to identify text regions. At step 910, the method identifies the two closest words within the object as a text region. In one embodiment, closeness is defined based on the x- and y-distances between the bounding boxes for the words within the object. These distances can represent the Euclidean and Manhattan distances, for example. At step 911, the clustering process calculates an average-x and an average-y distance for the words contained in the text region.

At step 912, the clustering process finds a word that is closest to the text region and that is not already contained in the text region. One example of the distance between a text region and a word not contained in the text region is defined as the smallest distance between the word and any word in the text region. Another example is the distance between the word and the bounding box of the text region.

At step 913, the clustering module determines whether the x- and y-distances for the closest word to the text region is smaller than a certain multiple of the average-x and average-y distances of the text region. Independent factors can be used for the x- and y-distances. If so, the word is added to the text region, at step 914, and the clustering module returns to step 912. If not, the text region is extracted from the set of words on the object, at step 915, and the clustering module returns to step 910 to find the next two closest words within the remaining words on the object. This process repeats until all words on the objects have been clustered into a text region.

III. Assisted Form Filling

The clustered text regions of recognized text blocks are then stored in an untagged media data store, such as on one of the local or remote memory devices shown in FIG. 1, for use by a form filling module.

Figure 12:
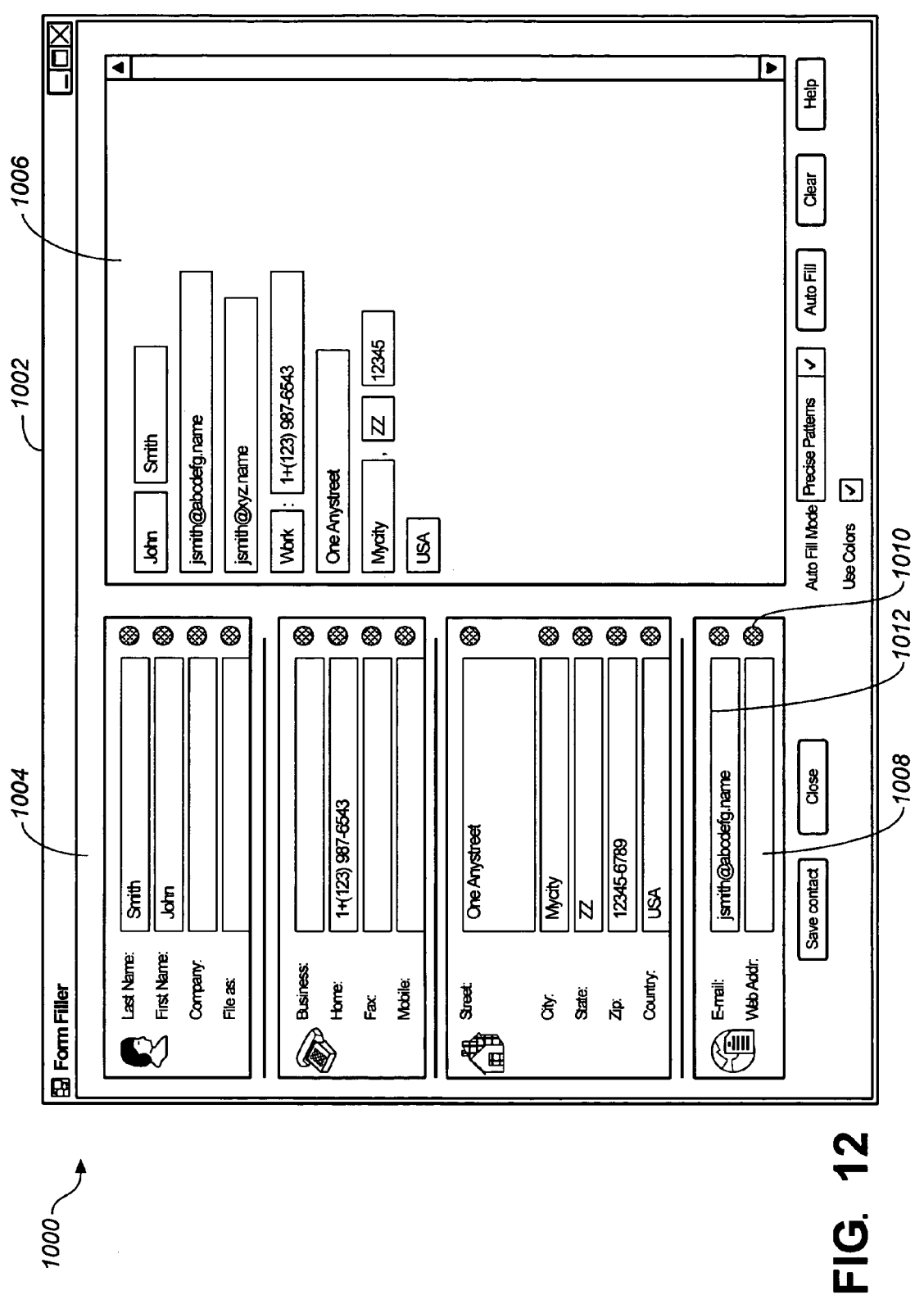

FIG. 12 is an illustration of a system 1000 for generating and operating a form filler interface (FFI) 1002 to facilitate assisted form filling of electronic forms according to one embodiment of the present invention. In this example, the form is a contact record in an address book. The form filling module presents form filler interface 1002 to a user to assist the user in filling the form by transferring the untagged data from the clustered text regions into tagged data (e.g., XML-formatted data), or to a database. The FFI 1002 (also referred to herein as "a computer "screen") comprises a form data graphical user interface (GUI) 1004 (also referred to herein as "the form") and an object data GUI 1006 (also referred to herein as a "text box"), which can be positioned adjacent to each other on the screen for user convenience.

The form data GUI 1004 comprises a plurality of fields 1008, such that each field is reserved for a particular piece of information (e.g., last name, first name, street address, zip code, etc.) A status indicator 1010 can be associated with each field 1008 in order to inform a user of a current status of information in the particular field. A confidence indicator 1012 can be also associated with each field 1008 to inform the user of a probability associated with the correctness of information in the field 1008. In addition, the form filler interface 1002 can display an image (not shown in FIG. 12) of the object being processed.

The FFI 1002 illustrated in FIG. 12 exemplifies an interface for entering contact information in an address book. Initially, the form data GUI 1004 and an empty text box 1006 are presented to the user. The user can copy the clustered text regions from the data store into the text box 1006 (e.g., via cutting and pasting from a display window on the screen). Alternatively, the form filling module can automatically insert the clustered text regions obtained from the associated object (e.g., business card, bill or receipt) into text box 1006. If the original image contains multiple objects, the form filling module fills one contact record for each object, for example.

The form filling module can attempt to classify, or parse, the untagged object data to identify information elements within the object data in text box 1006. Once the object data has been parsed, the module fills in the fields 1008 of form 1004 with the identified elements. The original untagged object data in the text box 1006 and the form 1004 can be simultaneously displayed on the screen 1002, and the now tagged object data can be augmented to visually indicate associations (e.g., using color coding or other visual indicator). For example, the system 1000 can utilize a purple color to indicate that certain elements in the text have been used to populate the address fields in the form 1004. According to the example, a separate color (e.g., orange) can be employed to indicate that the module has determined that specific text is potentially of interest, but that the confidence level is not high enough to assign it to a field, and, therefore, a user can make a determination of whether the specific text should be assigned to a particular field.

According to one embodiment of the invention, a user can fill in a portion of form 1004, and the form filling module can search through available object data in text box 1006, locate potential field-entry candidates, display the located elements, and fill in the remaining fields of the form. In this manner, a partial autofill can be performed.

In the case when the form filling module fails to correctly identify a block of text, such as the company name on a business card, it will likely have clustered that text region. The user can drag the block of text from text box 1006 to the appropriate field 1008, using a pointing device for example. This is especially useful for applications where documents such as receipts are scanned. There may be many blocks of digits and text on a receipt of which the user is interested only in entering fields such as the vendor name, date, final amount and possibly the tax. As long as these text regions are clustered and displayed in text box 1006, the user can drag appropriate text blocks to appropriate fields.

A user can quickly verify the correctness of the parsing. If the parse has errors, the user can correct them such as by dragging the element from the text box 1006 and dropping it on the corresponding field 1008 in the form 1004, by typing directly into a field 1008, and by correcting text in text box 1006. Additionally, parsing protocols can take advantage of side information, such as previous corrections or additions provided by the user. For example, if the user has entered information into a field or corrected an initial parse, the user can instruct the system to re-parse the object data and rely on the side information provided by the user (by clicking on a button marked 'Auto Fill' in FIG. 12).

For example, if the name "John Smith" is extracted from a business card, this suggests that "John" is a first name and that "Smith" is a last name of a particular contact. However, a user can recognize that the first and last names of the contact have been transposed in the original object, whether by accident or otherwise, and can employ the drag-and-drop technique described above to move "John" into the first name field. Additionally, fields can be provided with drop-down menus, such that where the object data displayed in the text box 1006 contains more than one first name, for example, one of the first names can be displayed in the first name field and the others can be provided in the drop-down menu. A user can simply open the menu (e.g., click on or hover over the field) and select an alternate name if the field requires correction.

Upon this action, the system can automatically move "Smith" into the last name field, reducing the number of user actions required to populate the form while increasing the confidence level for the last name field, based on the fact that the user verified that "John" is the first name of the contact and, therefore, is not the last name of the contact. Such automated post-user-action field filling is an example of correction propagation.

In some cases, it can be advantageous to allow the user to specify which fields can be used as side information. For example, these fields can include those that are filled or corrected by the user. The user can specify that other fields can be overwritten by the system. Such permissions can be facilitated through the status indicators 1010, which can indicate that a user has not acted on the field, or has verified, corrected and/or entered information into the field. The status of each field can be, for example, "unfilled and unverified," "filled automatically but unverified," or "user-or-automatically filled and verified."

For example, a field that is "unfilled and unverified" can have a status indicator 1010 of a first color (e.g., red). If the system 1000 fills the field (e.g., the field is automatically filled) then the status indicator can be upgraded to a second status indicator color (e.g., yellow) to alert the user that the field has been automatically filled but is unverified. Such an indicator can alert the user to a condition that requires user verification, but not necessarily correction, as in the "John Smith" example. If the user verifies that the information in the field is correct, the status indicator can be upgraded to a third color (e.g., green) to indicate a status of "filled and verified." To further this example, if the user enters information into a field having a red status indicator, then the status indicator can be upgraded directly to green, because the user has filled the field and verified the information to be correct by doing so. Thus the field is now "filled and verified." Furthermore, the confidence of another field or fields can be updated and/or improved via user verification and/or correction of the first field. For instance, in the "John Smith" example, both the first name and last name fields can have a yellow status indicator if it is unverified which name is the first name and which name is the last name. If the user verifies that. "John" is the correct first name, then the module can upgrade the status of the first name field to "user-filled and verified" (e.g., with a status indicator color of green). Because the user has verified that "John" is the first name (and therefore not the last name), the system can retain "Smith" in the last name field, and thus the confidence indicator for the last name field can be upgraded from yellow to green (e.g., automatically filled and verified) as well.

According to a related aspect of the invention, a color-coded confidence indicator 1012 (e.g., a drawn box around the field as shown in FIG. 12 or a border color of the field, a background color of the field and/or text, etc.) can be associated with a particular field 1008. For instance, a field that is difficult for the system 1000 to fill with a high confidence factor can be labeled according to a color scheme that can indicate to a user that information in the field is less than a desired confidence threshold. Confidence indicator(s) can represent a value from 0 to 1, in different shades of color. Furthermore, the confidence indicator 1012 in this example can be, for instance, a solid indicator, a blinking indicator, an indicator that fades in and out of full brightness, contrast, etc., or any other suitable indicator scheme that can indicate varied levels of confidence regarding the field(s) in question.

For example, a piece of information comprising an "@" or ".com" can be automatically inserted into an "email" field in the form. Similarly, a piece of information having the format (nnn) nnn-nnnn, nnn-nnn-nnnn, or nnn-nnnn, etc., where n is an integer, can be automatically inserted into a phone-number field with a high degree of confidence. It is to be appreciated that high-confidence indicia can be associated with other types of information with regard to the field into which such information can be inserted, and that automatic insertion of such information is not limited to email and/or phone number fields.

Figure 13:
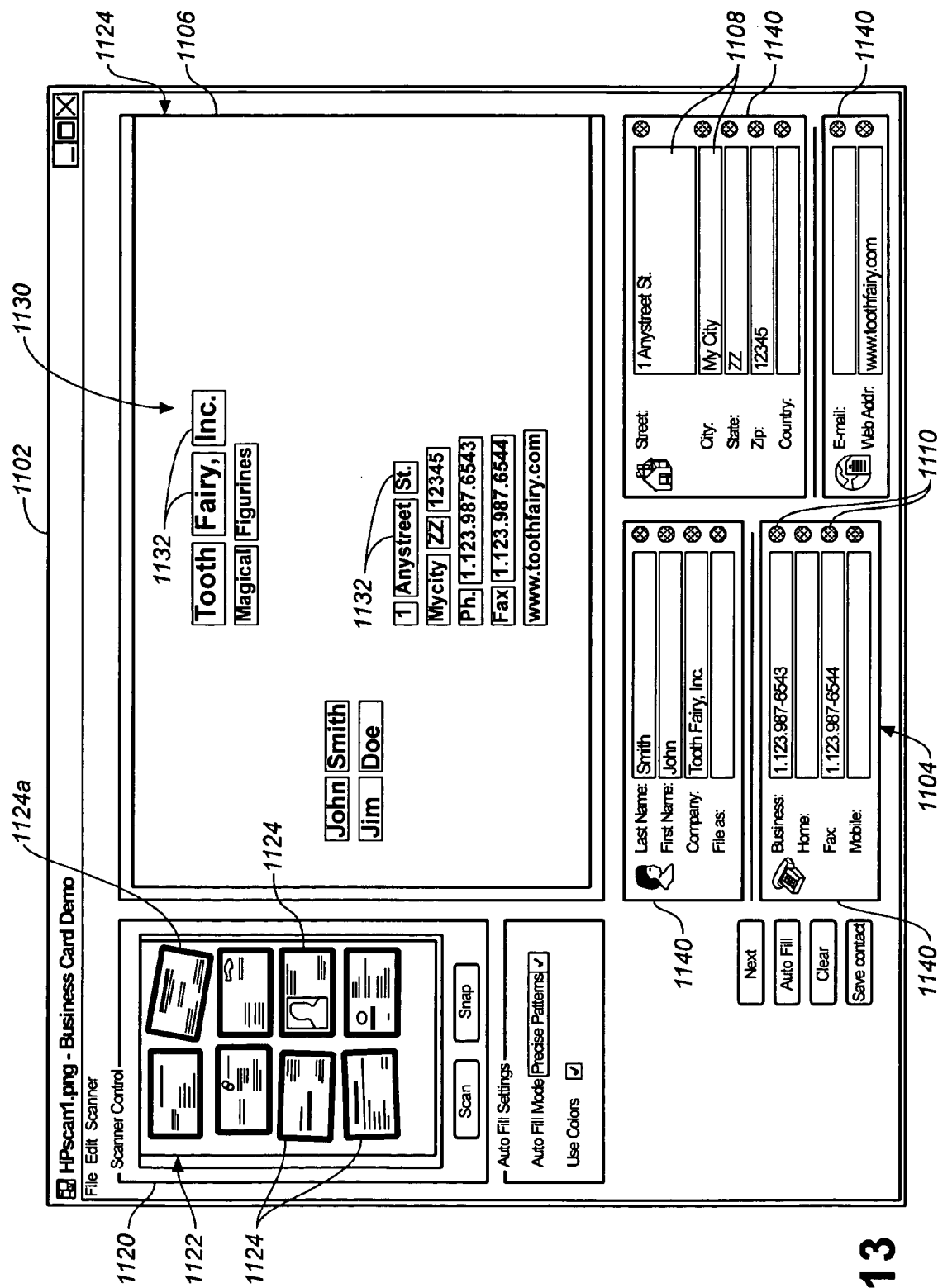
FIG. 13 is an illustration of a form-filling interface in accordance with an alternative embodiment of the invention.

FIG. 13 is an illustration of a form-filling interface 1102 in accordance with an alternative embodiment of the invention. Similar to the embodiment shown in FIG. 12, form-filling interface 1102 includes a form data GUI 1104 with a plurality of fields 1108 corresponding to different information types and a status indicator 1110 for each field 1108. However, form-filling GUI 1102 further includes a preview pane (GUI) 1120 for displaying an electronic image 1122 that has been obtained, such as from an optical scanner. Image 1122 includes a plurality of objects, such as business cards, 1124, which have been segmented from the image 1120 by the object detection and extraction module 202 shown in FIG. 3. In one embodiment, each object 1124 is highlighted by a colored border surrounding the object. For example, each object can be highlighted by a red border.

Since the individual objects 1124 have been segmented from the overall image 1122, the user can select each object individually by moving a cursor over the particular object 1124 and clicking on the object, for example. This object is then displayed in an object pane (GUI) 1106. Object pane 1106 is similar to the object data GUI 1006 shown in FIG. 12, but has been modified to display the selected object 1124 with the object data (parsed or unparsed) represented by text blocks 1130.

Each text block is identified in object pane 1106 by colored boxes 1132, for example, which surrounds the associated text. Text blocks that belong to the same information type can be highlighted with the same color box 1132. Text blocks from different clusters would therefore have different colored boxes 1132. This color can be coordinated with any colors used to identify different information regions 1140. For example, the words "Tooth Fairy, Inc." identify a company name and can be highlighted with blue box 1132, which can be coordinated with the same color of a corresponding information region 1140. Each word or token in a text block can have its own colored box 1132 as shown in FIG. 13 or all words of the same text block can be highlighted with a single colored box 132. Similarly, street address text blocks can have colored boxes of a different color, such as purple. Unused text blocks, such as "Magical Figurines", can be highlighted with yet another color box 1132.

Similar to the embodiment shown in FIG. 12, the color associations and highlighted text help the user to verify the parsed data and update or correct any of the fields 1108 that have been filled by the form filling module. The user can type directly in a field 1108, drag and drop information elements from object pane 1106 to the field, or select from a plurality of information elements through a drop-down menu in the field. For example, the form-filling module may identify "John Smith" and "Jim Doe" as two different sets of first and last names. If the form-filling module enters the incorrect name in the "First Name" and "Last Name" fields 1108, the user can simply select the correct name by one of the above-methods. As the corrections are being made, the form-filling module can re-parse the text blocks to make use of the new "side information" such that related fields can be updated automatically.

Again, status indicators 1110 indicate the status of any information in a particular field. These indicators can indicate "unfilled and unverified," "filled automatically but unverified," or "filled and verified," for example.

FIG. 13 also illustrates an example in which one of the objects 1124a is oriented at an arbitrary angle within the image 1122. In this example, object 1124a is oriented at an acute angle relative to horizontal. When selected, object 1124a is displayed in object pane 1106. However since the object detection and extraction system 202 (shown in FIG. 2) has identified the coordinates of each object 1124 and these objects have been "extracted" from the overall image, the sub-image of each object can be rotated to be oriented horizontally, right-side up as shown in object pane 1106. This also allows the OCR module to perform a reliable character recognition on each object and cluster the recognized text blocks for parsing by the form-filling module. The object can therefore have any arbitrary orientation within the overall image 1122, such as any angle between and including zero and 360 degrees.

Figure 14:
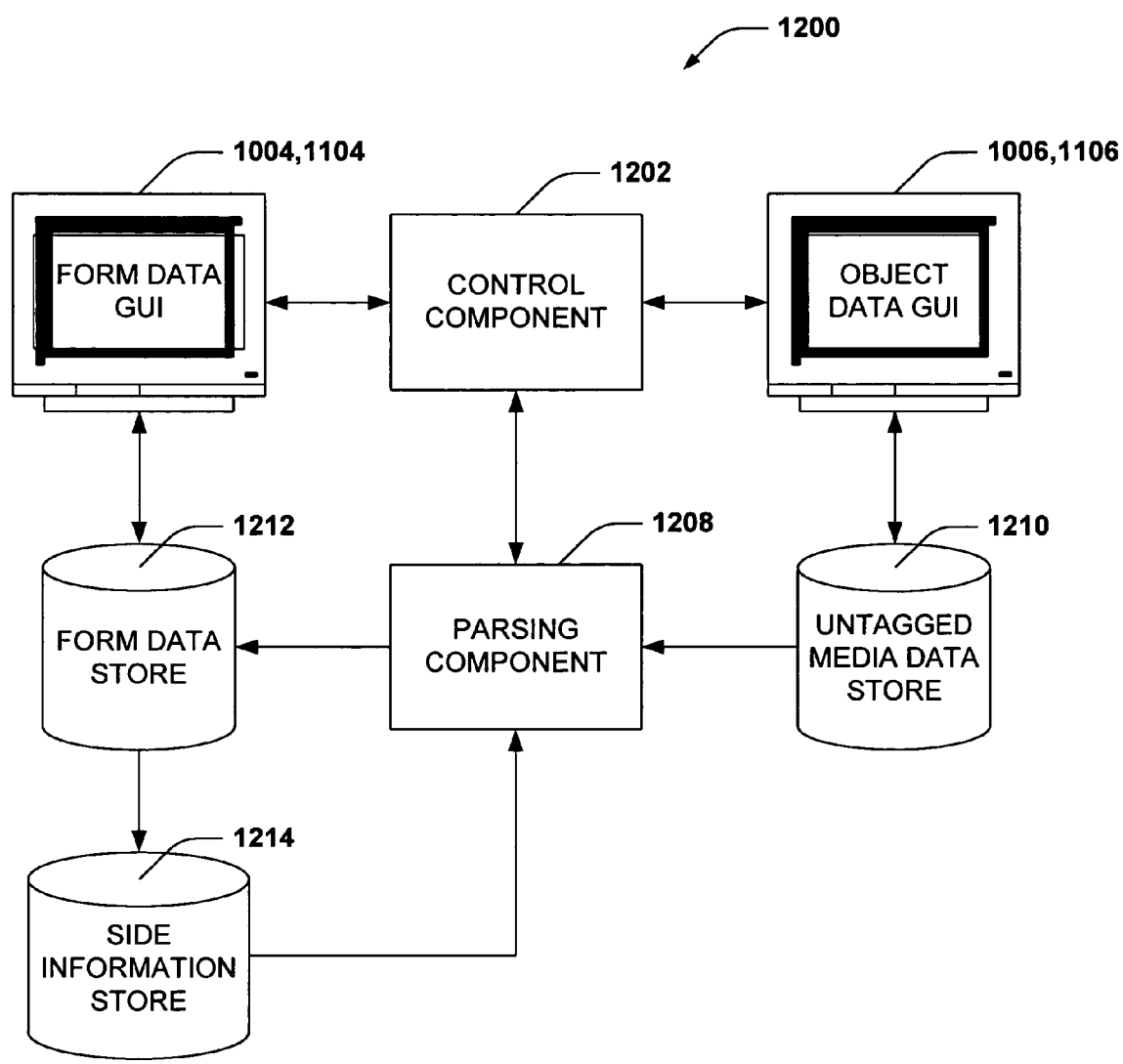
FIG. 14 is an illustration of a system, which facilitates assisted form filling through the interfaces shown in FIGS. 12 and 13, in accordance with one embodiment of the present invention.

FIG. 14 is an illustration of a form filling module or system 1200 that facilitates assisted form filling through form filling interface 1002 (shown in FIG. 12) or form filling interface 1102 (shown in FIG. 13), for example. Reference numbers from both FIGS. 12 and 13 are included in FIG. 14 to indicate similar elements in both embodiments. System 1200 includes a control component 1202, parsing component 1208, untagged media data store 1210, form data store 1212 and side information store 1214. Control component 1202 is operatively coupled to form data GUI 1004,1106, object data GUI 1006, 1106 and parsing component 1208. As used in this application, the term "component" refers to a computer-related entity, either hardware, a combination of hardware and software, software, or software in execution. For example, a component can include, but is not limited to, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The control component 1202 can receive and analyze untagged object data in order to facilitate populating fields in a form. Such untagged data can be presented to the user via the object data GUI 1006, 1106. The untagged data can be, for example, the recognized text from a business card, invoice or purchase receipt. The untagged data, as clustered into text regions, can be stored in an untagged media store 1210. Parsing component 1208 parses the untagged data stored in the untagged media data store 1210 to identify information types and determine potential form filler data. As mentioned above, the form filler data can include proper nouns, such as names, numerical data sets, addresses, phone numbers, zip codes, etc., which can then be stored in form data store 1212. Data stored in the form data store 1212 can be employed to populate fields in the form, and presented to the user via the form data GUI 1004,1104. Also, the tagged, parsed object data in object data GUI 1006, 1106 can be highlighted with a visual indicator to identify the particular information type or field to which the data belongs.

As described with respect to FIGS. 12 and 13, the user can then verify and or correct individual fields in the form, and such verifications and/or corrections can be stored as side information in side information store 1214. Parsing component 1208 can employ stored side information to update the form data store 1212 according to verifications and/or changes made by the user. In this manner, text classification and/or labeling can be updated, which permits status levels associated with the automatically filled fields to be upgraded in response to user verification and or correction of fields to facilitate correction propagation.

It will be appreciated that the data store (e.g., memories) components described herein can include, for example, any of the local or remote memories described with reference to FIG. 1, and can include volatile memory or nonvolatile memory, or can include both volatile and nonvolatile memory.

In one embodiment of the present invention, parsing component 1208 includes an artificial intelligence (AI) component that can make inferences regarding a most appropriate field into which a particular piece of data can be entered. As used herein, the term "inference" refers generally to the process of reasoning about or inferring states of the system, environment, and/or user from a set of observations as captured by events and/or data. Inference can be employed to identify a specific context or action, or can generate a probability distribution over states, for example. The inference can be probabilistic. That is, the inference can include a computation of a probability distribution over states of interest based on a consideration of data and events. An inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes or systems, such as support vector machines, neural networks, expert systems, Bayesian belief networks, fuzzy logic and data fusion engines, can be employed in connection with performing automatic and/or inferred action in connection with the subject invention. Furthermore, inferences can be made based upon, for example, hidden Markov models (HMM), in one embodiment of the present invention.

Figure 15:
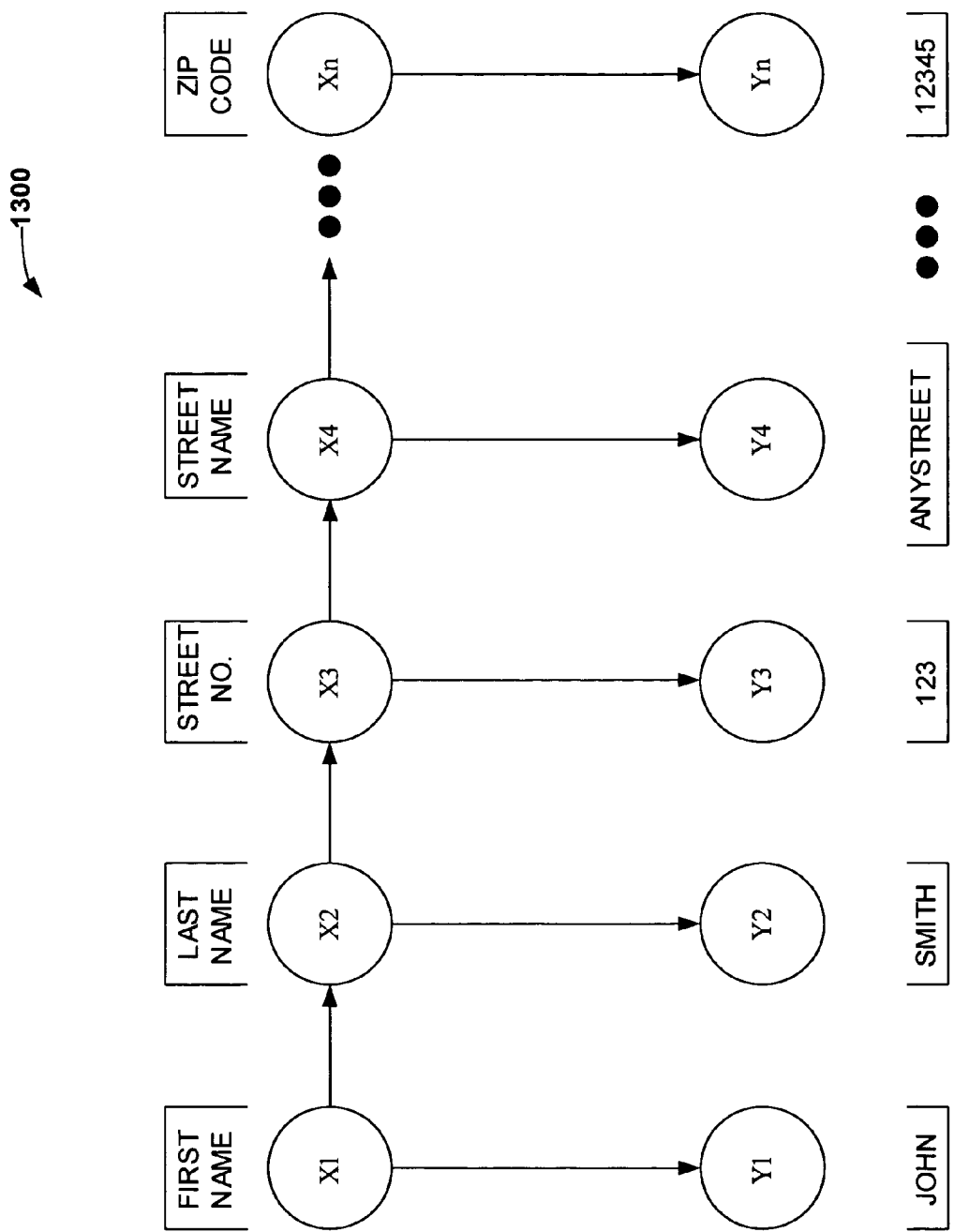
FIG. 15 is an illustration of an exemplary hidden Markov model, which facilitates assisting a user to populate fields in a form.

FIG. 15 is a diagram 1300 illustrating the use of HMMs to facilitate assisted form filling in accordance with one embodiment of the present invention. HMMs and other probabilistic models can be employed to "back-channel" information from a user interface to a parser in order to facilitate correction propagation, which permits correction of neighboring fields when a single field is corrected by a user. An HMM is a variant of a finite state machine having a set of states, Q, an output alphabet, O, transition probabilities, A, output probabilities, B, and initial state probabilities, Π. The current state is typically not observable. Instead, each state can produce an output with a certain probability, B. Usually the states, Q, and outputs, O, are understood, so an HMM is said to be a triple, (A, B, Π), with the following properties:

$$A = [a_{ij} = P(q_j \text{ at } t+1 | q_i \text{ at } t)]$$

$$B = [b_{ik} = P(o_k | q_i)],$$

$$\Pi = [p_i = P(q_i \text{ at } t=1)].$$

The notation, P(a|b) represents the conditional probability of "a" given "b". In the above equations, A is the probability of transitioning to next state "$q_j$" (at time t+1) given that the current state is "$q_i$" (at time t), where $q_i \epsilon Q$. B is the probability that the output is $o_k$ given that the current state is $q_i$, where $o_k \epsilon O$. Π is the probability of being in state $q_i$ at time t=1, for each state index, "i".

According to FIG. 15, various random variables $X_1$ through $X_n$ are illustrated, which can represent fields in a form. Such fields can be part of the set of fields including {first name, suffix, last name, street address number, street name, city, state, zipcode, phone number(s), email address (es), etc.}. It is to be understood that the set of X fields and the information element Y that can be entered therein are not limited by the above-described exemplary information fields, but rather can include any other suitable pieces of information and/or fields. Y can represent the actual information element corresponding to a given X, such that if $Y_1$ equals "John" and $X_1$="first name" is true (e.g., $P(X_1$=first name)=0.23, $P(X_1$=last name)=0.03, $P(X_1$=city name) =0.093, etc.), such that a label exhibiting the highest score (e.g., "first name," according to this example) can be chosen. Such inferences facilitate finding the best setting of the hidden variables. In the case of Hidden Markov models, the most likely states sequence can be found. For example:

$$\arg\max_{x_1,\ldots,x_n} p(Y_1 \ldots Y_n \mid X_1 = x_1, \ldots X_n = x_n)$$

According to a similar example, a particular X might have associated with it a condition "5 digits," such that if a Y has seven digits (e.g., 555-1234) then it will register a low probability (e.g., P(Y=555-1234|X)=0.00001) for the particular X in question. Conversely, a Y comprising information such as 12345 will register a high probability (e.g., P(Y=555-1234|X)=0.9989) for the particular X and can be inserted in the associated field in the form. Similarly, a seven-digit Y will register a high probability for an X having the condition "7 digits." The present invention can employ any number of suitable variables, or tests, to determine which particular Ys satisfy conditions associated with particular Xs in order to facilitate assisted form filling.

Some embodiments of the invention can capitalize on advantages of probabilistic models, such as the HMM described above, which contain hidden and observed random variables, by setting hidden variables (Xs) to states corresponding to labels of particular fields. For example, the Y random variables in the HMM described above are "observed" random variables, where each variable corresponds to one token. A token is a segment of text between token delimiters (e.g., spaces, dashes, commas, etc.). For example, the text string "this-is a, test" would be tokenized as:

"this"=token 1

"is"=token 2

"a"=token 3

"test"=token 4

The hidden variables, Xs, represent the probability that the tokens have each of the permitted labels (e.g., the tokens are distributed over the labels). In the field of information extraction, most often, the X's remain unobserved, since "side information" is not used. To force a probabilistic model to use side information (e.g. in the form of a text field with user supplied text), a token corresponding to the user supplied text can be searched for and the corresponding hidden variable X can be set to the state corresponding to the label of the field. This can be viewed as setting p(X1=First Name)=1 and P(X1=LastName)=0, etc., and not updating during inference. For example, if the user typed "Smith" into the last name field of the form, a search can be performed through all tokens to find "Smith." Then, set P(X2=LastName)=1, and do not update the probability distribution for P(X2) during inference.

Correction propagation can further be achieved back-channeling information from a user interface to the parser. In such a manner, neighboring fields can be populated when a single field is corrected by a user. For example, the invention can employ a rule-based parsing method wherein a simplified version of a rule states "if LastName field is set by the user, then search for the last name in the untagged text and label the word immediately preceding the last name as a first name." There can also corresponding rule for first names. In this manner, correction of the last name "propagates" to the first name. It is to be understood that correction propagation as described herein is not limited to first and last names, but rather can be applied to any and all relevant types of information, text, etc.

Additionally, some embodiments of the invention can employ conditional random fields (CRFs), which are a generalization of both HMMs and maximum entropy models. CRFs allow for the introduction of arbitrary non-local features and capture the dependencies between labels, permitting confidence of the parsed pieces of information to be estimated. In this manner, the present invention can automatically assign a parsed piece of information to a field when the information has a high confidence level, and can flag an information element as having a low confidence level for user review and/or correction.

Figure 16:
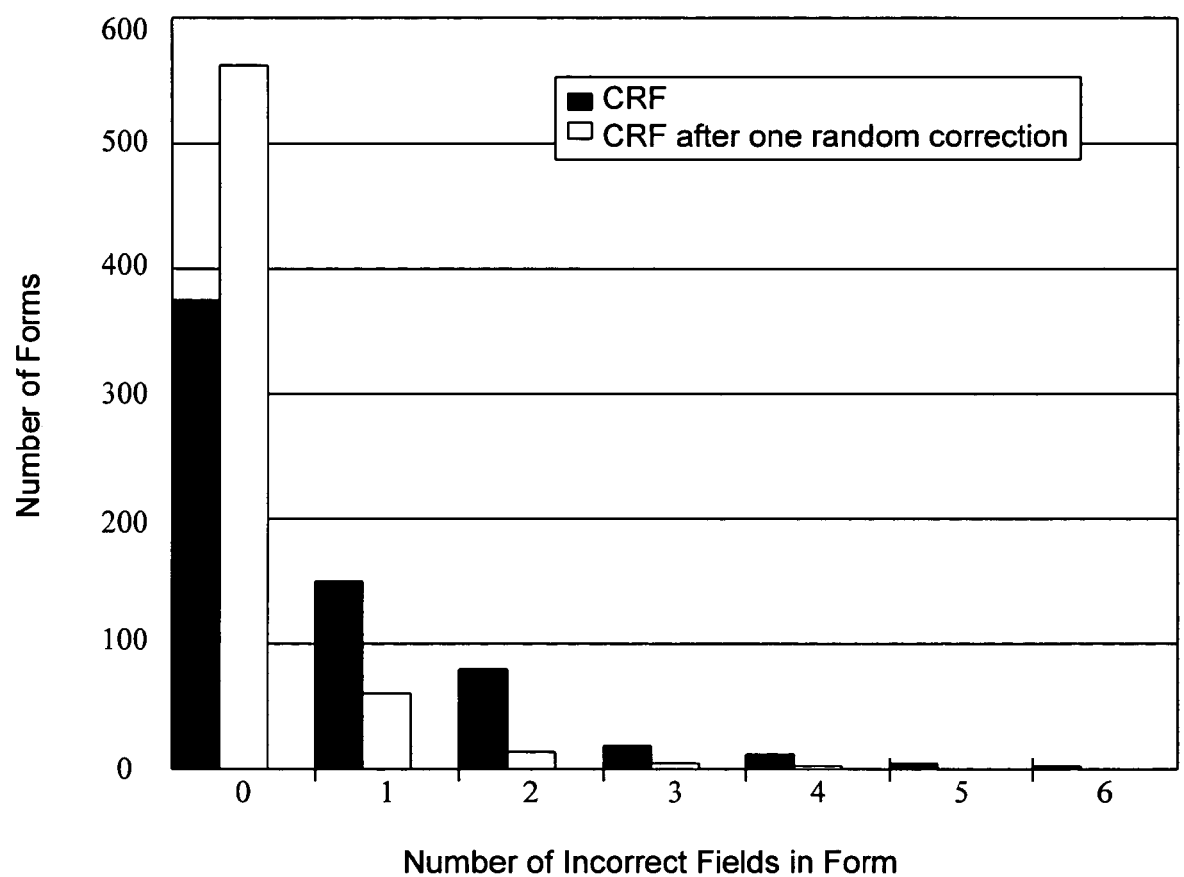
FIG. 16 is a histogram, which illustrates the efficiency of invention in assisting a user to populate a form.

FIG. 16 is a histogram 1400, which shows a relationship between CRFs before and after a random incorrect field has been corrected. As described in more detail below, forms are grouped in FIG. 16 according to the number of fields containing errors in each form. Solid bars indicate CRFs before any correction(s), and hollow bars indicate the distribution after one random incorrect field has been corrected. During form filling, user behavior with regard to field verification and correction can be anticipated and/or modeled via a number of user interaction models (UIM). For example, in a simple scenario, UIM1 a user can be presented with an auto-filled form and can be required to correct all errors (e.g., correction propagation is not performed). Thus, the number of user actions required equals the total number of errors that occurs during automatic filling.

According to a second scenario, UIM2, an initial automatic field assignment is assumed, and a user performs a single, randomly chosen correction, based upon which the system can initiate correction propagation. This can be iterated until all fields are correct.

According to a third scenario, UIM3, an initial automatic field assignment is assumed, and a user performs a correction on the least confident incorrect field. For example, the user can be visually alerted to the fields in order of confidence, such as by confidence indicators 1012 in FIG. 12, until an error is found. Correction propagation can be performed in accordance with the correction of the least confident field, and the user can be prompted to correct any remaining errors.

Form filling typically requires perfect accuracy. Thus, benefits can be realized whenever filling time is reduced, cognitive load on a user is reduced, or both. One embodiment of the invention employs an efficiency measure, called the expected number of user actions (ENUA), in addition to other standard performance measures. ENUA is defined as the number of user actions (e.g., clicks, etc.) required to correctly fill all fields in a form. The ENUA can vary depending on the UIM, as discussed above. To express the ENUA, the notation P(i;j) is used, which is the probability distribution over the number of errors j after i manual corrections. Such distribution is represented by the histogram of FIG. 16.

Under UIM1, for example, the ENUA is:

$$ENUA = \sum_{n=0}^{\infty} nP(0; n)$$

where P(0;n) is the distribution over the number incorrect fields.

According to models UIM2 and UIM3, for example, ENUA is:

$$ENUA^1 = (1 - P(0; 0)) + \sum_n nP(1; n)$$

where P(0;0) is the probability that all fields are correctly assigned initially and P(1;n) is the distribution over the number of incorrect fields in the form after one field has been corrected. Different distributions can result depending on which UIM is employed. The superscript 1 on $ENUA^1$ indicates that correction propagation has been performed once.

Still referring to FIG. 16, forms are grouped according to the number of fields containing errors in each form. Solid bars indicate the result of using a CRF based parser before any correction(s), and hollow bars indicate the distribution after one random incorrect field has been corrected. Such information can be utilized to estimate P(0;n) and P(1;n) respectively.

Figure 17:
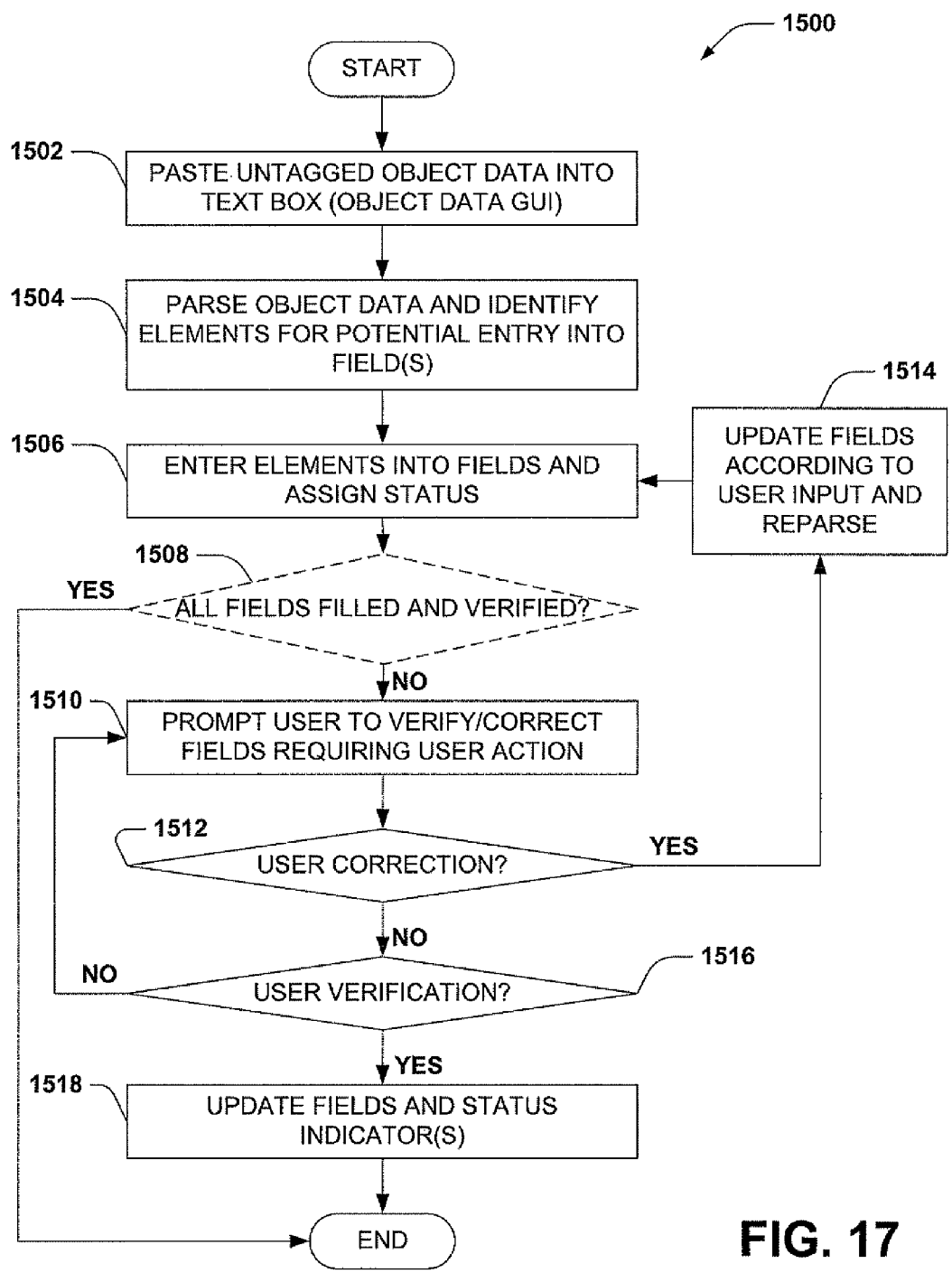
FIG. 17 is a flow chart illustrating a method of filling a form, in accordance with one embodiment of the present invention.

FIG. 17 is a flow chart illustrating a method 1500 for automatic form filling assistance in accordance with one embodiment of the present invention. While one or more methodologies are shown and described as a series of acts or steps, it is to be understood that the present invention is not limited by the order of steps, as some steps may, in accordance with the present invention, occur in a different order and/or concurrently with other steps from that shown and described herein. For example, those skilled in the art will understand that a methodology could alternatively be represented as a series of interrelated states or events, such as in a state diagram. Moreover, not all illustrated steps may be required to implement a methodology in accordance with the present invention.

At 1502, selected untagged data is inserted into a text box in an object data GUI. In the example shown in FIG. 12, the untagged data is displayed in object data GUI 1006. In the example shown in FIG. 13, the object data is displayed within an image of the object in object data GUI 1106. At 1504, the object data is parsed to determine elements that can potentially be utilized to populate specific fields in a form. Statuses can be assigned to elements entered into fields and indicated to a user at 1506. For example, selected untagged data such as "John Smith" and "Jane Doe" contains two first names and two last names. If "John" is used to populate a "First Name" field in, for example, a contact list, then it can have associated with it a status indicator (e.g., "filled but unverified") that can alert a user to the fact that "John" may not be a correct entry in the first name field. Additionally, "Jane" can be made available to the user via a drop-down menu to facilitate potential user correction of the First Name field. The indicator can be, for example, a color-coded status indicator "light" next to the First Name field. To further this example, a red-yellow-green protocol can be employed to indicate varied status levels, wherein red indicates filled but unverified, and green indicates that a field is filled (either automatically or by the user) and verified. In the present example, the First Name field can have a yellow status indicator, indicating that the First Name field is filled, but that the first name "John" has not been verified.

In one embodiment, the method can proceed directly to step 1510 in which the user is prompted to verify or correct fields exhibiting anything less than, for example, green status (e.g., where green indicates filled and verified status).

In another embodiment, the method first proceeds to 1508 in which a determination is made regarding whether all fields exhibit a highest possible status (e.g., whether all fields are "filled and verified"). If all fields display the "filled and verified" status at 1508, then the user need not be prompted to take action and the process can terminate.

However if any field exhibits less than a "filled and verified" status, then the method can proceed to 1510, where the user is prompted to correct and/or verify any suspect fields. At 1512, a determination is made regarding whether the user has corrected (e.g., altered) any information. According to the present example, if "John" is not the desired entry in the "First Name" field, then the user can click on "Jane" in the text box (or object pane) and drag "Jane" into the First Name field to correct the entry. Alternatively, "Jane" can be selected from a drop down menu already presented in the First Name field. If the user has corrected any information, then the method can proceed to 1514 where one or more fields can be updated according to the user input, and untagged data in the text box 1006 (FIG. 12) or object pane 1106 (FIG. 13) can be re-parsed. The method can then revert to 1506 for status upgrade and entry of data into form fields, which can occur with regard to the user input.

If the user does not correct information at 1512, then a determination can be made at 1516 regarding whether the user has verified field entries. If the user has not verified field entries with less-than-desired status, at 1516, then the method can revert to 1510 for further prompting of the user to take action. If the user verifies accurate information at 1516, then fields and their corresponding status can be updated at 1518. For example, if "John" is the desired entry for the First Name field, then a status indicator can be upgraded from yellow to green.

Figure 18:
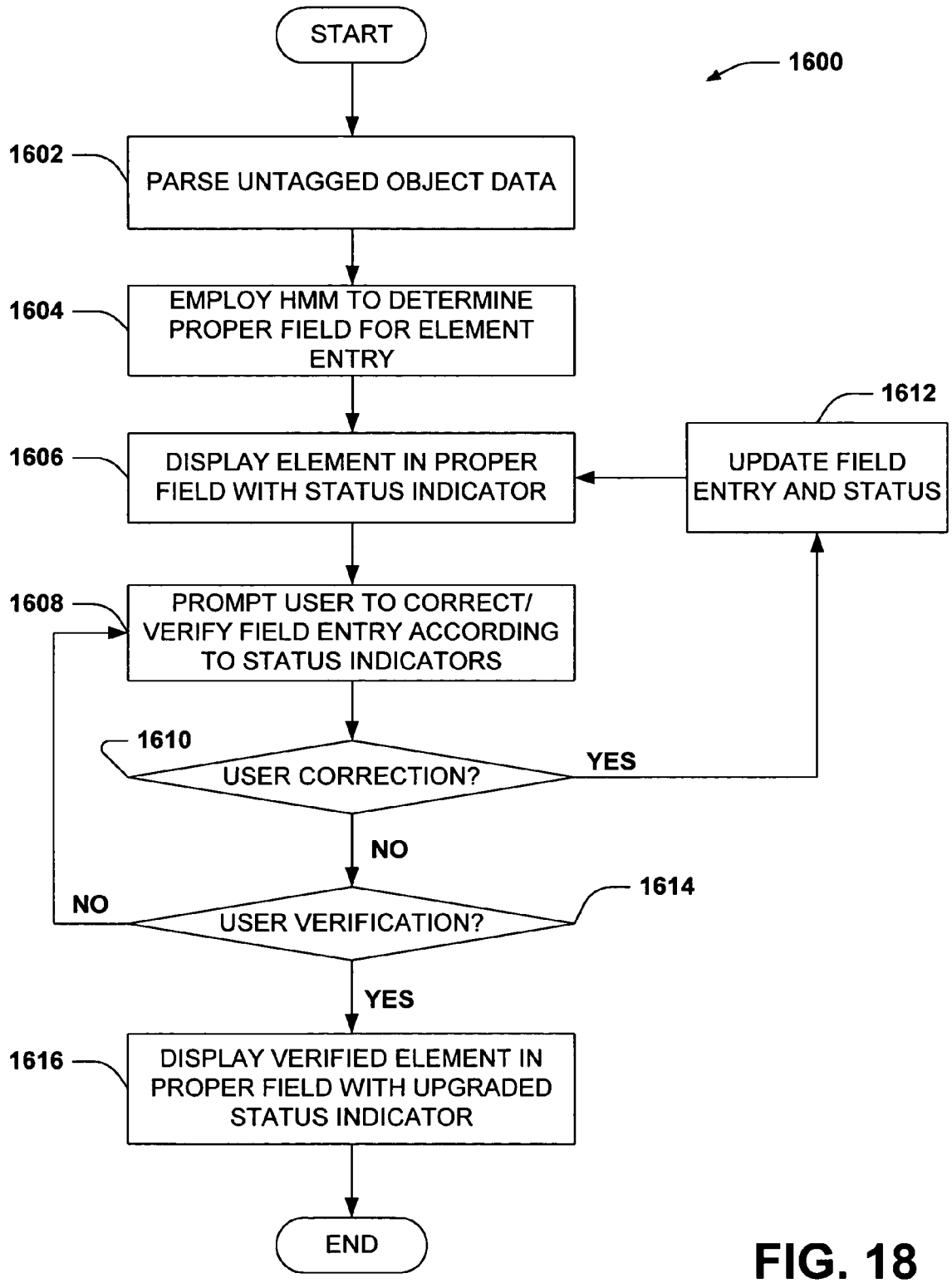
FIG. 18 is a flow chart illustrating a method of filling a form, in accordance with another embodiment of the present invention.

FIG. 18 is a flow chart illustrating a method 1600 in accordance with another embodiment of the present invention. At 1602, untagged data is parsed. At 1604, hidden Markov models (HMM) are employed to determine a proper field into which a particular element can be entered. At 1606, element(s) are displayed in the determined proper fields with a status indicator. A user can be prompted at 1608 to verify and/or correct information entered in the field(s). At 1610, a determination is made regarding whether user correction has been detected. If so, then at 1612 the user-corrected field(s) can be updated along with other field(s) through correction propagation, and their corresponding status indicators can be upgraded accordingly. The method can then revert to 1606 where elements are displayed and status is indicated in accordance with user input. If correction is not detected at 1610, then at 1614 a determination is made regarding whether user verification has occurred. If the user has not verified the entered information to be correct, then the method can revert to 1608 for further prompting of the user to take action. If, at 1614, it is determined that the user has verified information in a suspect field to be correct, then the method can proceed to 1616, where the verified element is displayed in the proper field and upgraded status is displayed.

Figure 19:
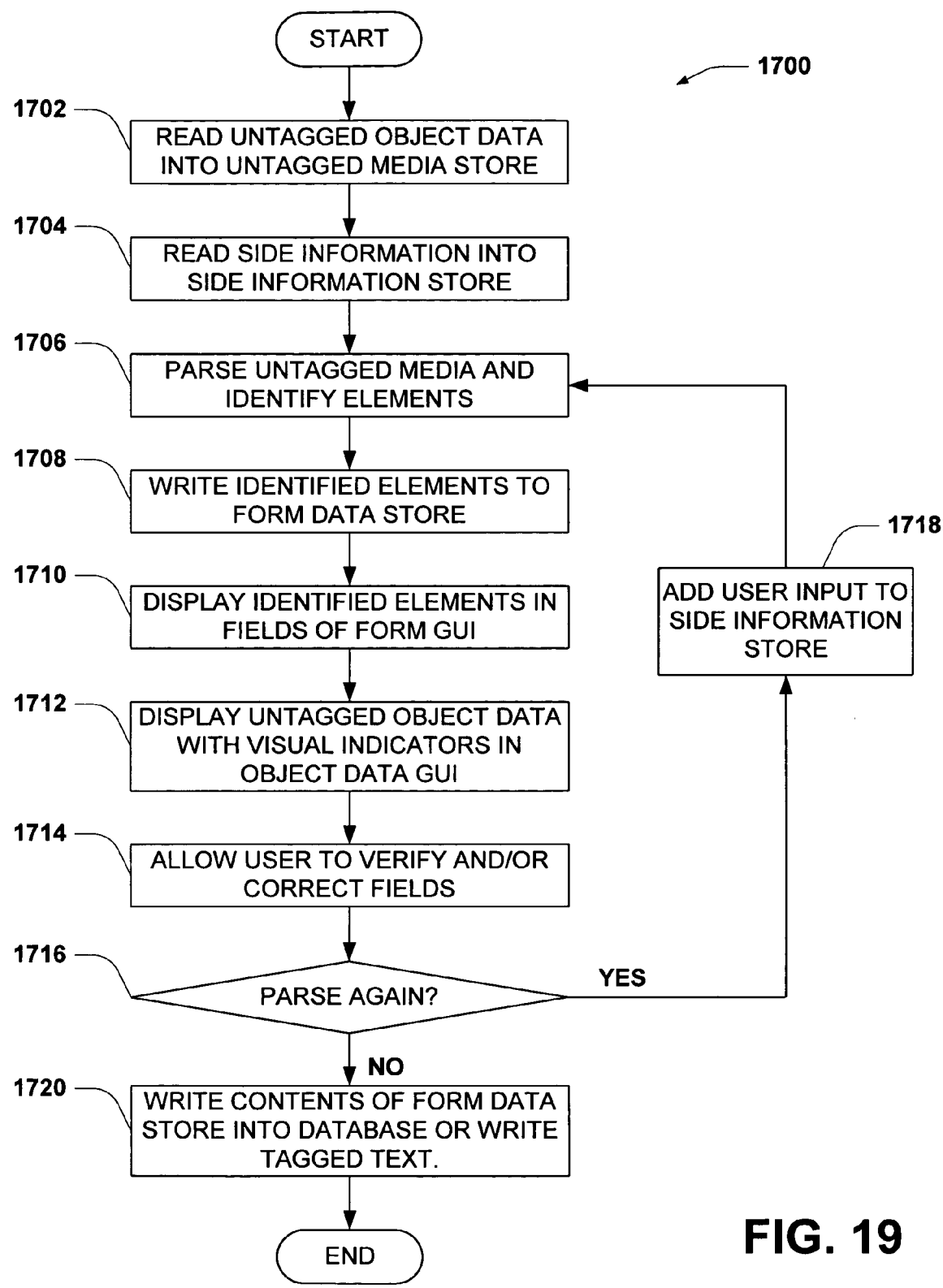
FIG. 19 is a flow chart illustrating a method of filling a form, in accordance with another embodiment of the present invention.

FIG. 19 is flow chart illustrating a method 1700 in accordance with another embodiment of the present invention. At 1702, untagged object data is read into an untagged media store. At 1704, side information (e.g., information gleaned from user action such as data entry, verification, correction, etc.) is read into a side information store. At 1706, the untagged data is parsed to identify elements that can potentially populate form fields. Identified elements can be written to a form data store at 1708. Then, at 1710, identified elements can be displayed to a user in form fields in a form GUI. At 1712, object data in the object data GUI can be displayed with visual indicators that facilitate assisting the user in filling the form fields. For example, first names in the object data GUI can be color-coded in a specific color (e.g., orange) in order to indicate that they can be entered in a First Name field in the form GUI, which is also color-coded in orange. According to another example, parsed object data comprising a "@" symbol can be coded in, for example, blue, to indicate that such text may be entered in an "email" field in the form GUI, which can also be colored blue.

At 1714 the user is prompted to verify and/or correct assignments of elements to fields in the form GUI. Then, at 1716 a decision can be made to parse the object data again. If such a decision is made, then at 1718, user input is added to the side information store, and the method reverts to 1706 for reiteration of untagged data parsing and element identification. If it is determined that no additional parsing is required at 1716, then at 1720, the contents of the form data store can be written into a database or file.

The methods shown in FIGS. 17-19 can be performed for each of the individual objects that are extracted from the overall image being scanned. In the example where each object is a business card, the textual information on each card is parsed and used to fill the form fields in a corresponding form, such as a contact record in an address book. Therefore, one contact record will be created for each business card contained in the image. The extracted image of each card can also be stored with the contact record.

In these examples, a user does not need to scan each business card separately. Rather, many cards can be imaged at a time. From the overall image, the system extracts the image of each card and then identifies the information elements on each card and assists the user in assigning these elements to corresponding fields in separate contact records. This greatly increases the efficiency of entering data from numerous cards.

In the example where each object is a purchase receipt, the text blocks on each receipt are clustered and displayed in the untagged text box 1006 (shown in FIG. 12). In the example shown in FIG. 13, each receipt can be selected separately in the preview pane 1120 and displayed in the object pane 1106. The text blocks within the receipt are parsed and used to fill the appropriate fields in a corresponding form, such as an expense report or other financial software application. There may be many blocks of digits and text on a receipt of which the user is interested only in entering fields such as the vendor name, date, final amount and possibly the tax. As long as these text regions are identified and displayed in object data GUI 1006 or 1106, the user can drag appropriate text blocks to appropriate fields 1008 (FIG. 12) or 1108 (FIG. 13).

In one embodiment, the user can scan several receipts at a time, drag and drop the date, amount, and/or other blocks of text in each receipt to the appropriate fields in a financial software application, such as an expense report application, spreadsheet or money management software such as Microsoft Money™. An image of the receipt can be stored for reference and/or sent with the expense report. For expense report filing systems, a cryptographic hash of the image file can be encrypted using a public key of the paying party to prevent tampering with the digital image.

In another embodiment, the system is capable of extracting multiple objects of different types from a single image. For example, several business cards and receipts can be scanned at the same time and then each object is extracted from the overall image. Once the textual elements of each object have been identified and/or clustered, the textual elements can be processed to determine the type of object being scanned. Objects having contact information, such as a company name, individual's name, address, telephone number, e-mail address, etc. are likely to be business cards. Objects having vendor names, dates, and digits in columns representing financial amounts are likely to be receipts. Other types of object can also be scanned. Based on the particular type of object, the system assists the user in entering the text into the appropriate electronic form. For example in the embodiment shown in FIG. 13, the system displays the selected object in object data GUI 1106 and the fields 1108 of the appropriate form in form GUI 1104. Alternatively, the system can display the object's image in object data GUI 1106 and prompt the user to identify the type of object before displaying the fields of the appropriate electronic forms for completion.

It is to be appreciated that the systems and/or methods of the present invention can be utilized in web-crawling systems facilitating computer components and non-computer related components alike. Further, those skilled in the art will recognize that the systems and/or methods of the present invention are employable in a vast array of electronic related technologies, including, but not limited to, computers, servers and/or handheld electronic devices and the like which can be wired and/or wireless and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

Although the present invention has been described with reference to preferred embodiments, workers skilled in the art will recognize that changes may be made in form and detail without departing from the spirit and scope of the invention. For example, a form can be populated from any electronic image of one or more objects. The image can be obtained by any type of digital imaging equipment, such as an optical scanner or a digital camera. The object or objects can include any type of document having useful textual information, such as a business card, bill or purchase receipt.

What is claimed is:

1. A computer-implemented method for populating an electronic form from an electronic image, the method comprising:

(a) identifying a size, orientation and position of a first object having any arbitrary orientation within the electronic image;

(b) identifying information elements from pixels within the electronic image that correspond to the first object, including identifying text blocks within the first object using optical character recognition;

(c) displaying simultaneously to a user fields of the electronic form in a form data area and the identified text blocks in an object data area that is outside of the form data area, which corresponds to the first object, through a graphical user interface, wherein the text blocks are selectable by the user within the object data area through the graphical user interface for insertion into respective fields of the electronic form in the form data area;

(d) parsing the information elements into tagged groups of different information types;
(e) automatically populating the fields of the electronic form with the tagged groups to produce a populated form and allowing the user to edit the populated fields through the graphical user interface; and
(f) providing a visual status indicator adjacent each field of the form data area alerting the user that the field is unfilled and unverified, filled but unverified, and filled and verified, the status being based on the automatic populating and user editing.

2. The method of claim 1 wherein (a) comprises identifying a size, orientation and position of the first object among a plurality of objects within the electronic image.

3. The method of claim 1 wherein (a) comprises:
classifying each pixel within the image to produce pixel classification data;
defining an image function to process the pixel classification data;
dividing the image into sub-images based on disparities in the image function; and
processing the sub-images to determine a size, an orientation and a position for each of the objects, including the first object.

4. The method of claim 3 and further comprising repeating the classifying pixels, defining an image function, and dividing of the image until the image contains a single object or the image can no longer be divided.

5. The method of claim 3 wherein classifying comprises classifying each pixel as one of a data pixel or a background pixel.

6. The method of claim 5 and further comprising:
defining the image function as a sum of data pixels in a certain direction;
calculating the image function in a first direction to generate a first data set;
calculating the image function in a second direction to generate a second data set; and
searching far disparities in the image function in the first direction and the image function in the second direction.

7. The method of claim 1 wherein:
(b) comprises identifying two-dimensional locations of the text blocks within the first object.

8. The method of claim 7 wherein:
(c) comprises displaying to the user the identified information elements in the object data area within an image of the first object through the graphical user interface; and
(d) comprises highlighting the tagged groups of different information types within the image of the first object in the object data area with visual indicators that indicate the different information types.

9. The method of claim 1 wherein:
(d) comprises receiving the information elements as untagged media from an untagged media store, and parsing the untagged media to identify information types of the information elements;
(c) comprises automatically populating at least one of the fields with at least one of the information elements based on the information type of that element; and
(e) comprises displaying the information elements through an object data graphical user interface and displaying the populated fields and any unpopulated fields through a form graphical user interface.

10. The method of claim 9 wherein (c) further comprises employing visual indicator in the object data graphical user interface to indicate that an information element is compatible with a particular field in the form.

11. The method of claim 1 wherein (c) further comprises prompting the user to perform at least one of verifying or correcting the at least one information element in the at least one populated field based on the status indicator associated with that field.

12. The method of claim 11 wherein (d) comprises updating other fields of the populated form based on at least one of the user verification or correction of the at least one information element.

13. The method of claim 1 and further comprising:
(g) writing side information gleaned from edits made to any of the populated fields to a side information store; and
(h) re-parsing the information elements into tagged groups of different information types in (d) and re-populating at least one other field in (e) based on the side information.

14. The method of claim 1 wherein the electronic image comprises a plurality of objects and the method further comprises:
(g) performing (a) through (e) for each object, such that, for each object, fields of a corresponding electronic form are at least partially populated with information elements obtained from pixels within that object.

15. The method of claim 14 wherein the plurality of objects comprises objects of different types.

16. A computer-readable medium comprising computer storage media and computer-executable instructions, which are stored on the computer storage media and that, when executed by a computer, perform a method comprising:
(a) identifying a size, orientation and position of a first object having any arbitrary orientation within an electronic image;
(b) identifying information elements from pixels within the electronic image that correspond to the first object, including identifying text blocks within the first object using optical character recognition;
(c) displaying simultaneously to a user fields of the electronic form in a data area and the identified text blocks in an object data area that is outside of the form data area, which corresponds to the first object, through a graphical user interface, wherein the text blocks are selectable by the user within the object data area through the graphical user interface for insertion into respective fields of the electronic form in the form data area;
(d) parsing the information elements into tagged groups of different information types;
(e) automatically populating the fields of the electronic form with the tagged groups to produce a populated electronic form and allowing the user to edit the populated fields through the graphical user interface; and
(f) providing a visual status indicator adjacent each field of the form data area alerting the user that the field is unfilled and unverified, filled but unverified, and filled and verified, the status being based on the automatic populating and user editing.

17. The computer-readable medium of claim 16 wherein the electronic image comprises a plurality of objects, including the first object, and the method further comprises:
(g) performing (a) through (e) for each object such that, for each object, fields of a corresponding electronic form are at least partially populated with information elements obtained from pixels within that object.

18. The computer-readable medium of claim 17 wherein the plurality of objects comprises objects of different types.

19. The computer readable medium of claim 16 wherein (a) comprises:
classifying each pixel within the image to produce pixel classification data;
defining an image function to process the pixel classification data;
dividing the image into sub-images based on disparities in the image function; and
processing the sub-images to determine a size, an orientation and a position for each of the objects, including the first object.

20. The computer-readable medium of claim 19 wherein classifying comprises classifying each pixel as one of a data pixel or a background pixel.

21. The computer-readable medium of claim 20 and further comprising:
defining the image function as a sum of data pixels in a certain direction;
calculating the image function in a first direction to generate a first data set;
calculating the image function in a second direction to generate a second data set; and
searching for disparities in the image function in the first direction and the image function in the second direction.

22. The computer-readable medium of claim 16 wherein:
(b) comprises identifying two-dimensional locations of the text blocks within the first object; and
(d) comprises highlighting the tagged groups of different information types within the image of the first object in the object data area with visual indicators that indicate the different information types.

23. The computer-readable medium of claim 16 wherein:
(d) comprises receiving the information elements as untagged media from an untagged media store, and parsing the untagged media to identify information types of the information elements;
(e) comprises automatically populating at least one of the fields with at least one of the information elements based on the information type of that element; and
(c) comprises displaying the information elements through an object data graphical user interface and displaying the populated fields and any unpopulated fields through a form graphical user interface.

24. The computer-readable medium of claim 23 wherein (c) further comprises employing visual indicator in the object data graphical user interface to indicate that an information element is compatible with a particular field in the form.

25. The computer-readable medium of claim 16 wherein (c) further comprises prompting the user to perform at least one or verifying or correcting the at least one information element in the at least one populated field based on the status indicator associated with that field.

26. The computer-readable medium of claim 25 wherein (d) comprises updating other fields of the populated form based on at least one of the user verification or correction of the at least one information element.

27. The computer-readable medium of claim 16 and further comprising:
(g) writing side information gleaned from edits made by the user in step (c) to a side information store; and
(h) re-parsing the parsing the information elements into tagged groups of different information types in (d) and re-populating at least one other field in (e) based on the side information.

28. A system for a least partially populating electronic forms, the system comprising:
a display device;
an object detection and extraction module, which processes pixels in the electronic image to identify a size, orientation, and position of an object having any arbitrary orientation within the electronic image;
on optical character recognition module, which identifies information elements, including text blocks, from pixels within the electronic image that correspond to the first object;
a graphical user interface, which simultaneously displays to a user, on the display device, fields of the electronic form in a form data area and the identified text blocks in an object data area that is outside of the form data area and corresponds to the first object, and wherein the text blocks are selectable by the user within the object data area through the graphical user interface for insertion into respective fields of the electronic form in the form data area; and
a parsing module, which parses the information elements into tagged groups of different information types and at least partially populates the fields with the tagged groups automatically to produce a populated electronic form, wherein the graphical user interface provides a visual status indicator adjacent each field of the form data area alerting the user that the field is unfilled and unverified, filled but unverified, and filled and verified, the status being based on the automatic populating and user editing.

29. The system of claim 28 wherein the graphical user interface allows the user to edit the populated fields and any unpopulated fields.

30. The system of claim 29 wherein the parsing module comprises means for updating other fields of the populated form according to edits made by the user to the populated fields and the unpopulated fields.

31. The system of claim 28 wherein the object detection and extraction module comprises:
a data pixel detection module that classifies each pixel of the image and defines an image function;
a segmentation module that is capable of dividing the image into smaller sub-images based on disparities in the image function; and
a single object extraction module that processes the sub-images to detect a number, a size, an orientation and a position of objects within the image.

32. The system of claim 31 wherein the data the detection module classifies each pixel as cue of a data pixel or a background pixel.

33. The system of claim 32 wherein the data pixel detection module defines the image function as a sum of data pixels in a certain direction, calculates the image function in a first direction to generate a first data set, calculates the image function in a second direction to generate a second data set, and searches for disparities in the image function in the first direction and the image function in the second direction.

34. The system of claim 28 wherein:

the optical character recognition module comprises means for identifying two-dimensional locations of the text blocks within the first object; and the graphical user interface comprises means for displaying the identified text blocks within an image of the first object to the user through the graphical user interface and highlighting the tagged groups of different information types within the image of the first object with visual indicators that indicate the different information types.

35. The system of claim 28 wherein:

the parsing module comprises means for receiving the information elements as untagged media from an untagged media store, parsing the untagged media in identify information types of the information elements, and automatically populating at least one of the fields with at least one of the information elements based on the information type of that element; and the graphical user interface comprises means for displaying the information elements through an object data graphical user interface and displaying the populated fields and any unpopulated fields through a form graphical user interface.

36. The system of claim 35 wherein the object data graphical user interface comprises a visual indicator to indicated that an information element is compatible with a particular field in the form.

37. The system of claim 28 wherein the graphical user interface comprises means for prompting the user to perform at least one of verifying or correcting at least one information element in at least one populated field based on the status level indicator associated with that field.

* * * * *